US012735261B2

(12) United States Patent
Li et al.

(10) Patent No.: US 12,735,261 B2
(45) Date of Patent: Sep. 15, 2026

(54) METHOD AND DEVICE FOR STORING GOODS, ROBOT, WAREHOUSING SYSTEM AND STORAGE MEDIUM

(71) Applicant: HAI ROBOTICS CO., LTD., Shenzhen (CN)

(72) Inventors: Huixiang Li, Shenzhen (CN); Jui-chun Cheng, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 653 days.

(21) Appl. No.: 18/318,453

(22) Filed: May 16, 2023

(65) Prior Publication Data

US 2023/0286750 A1 Sep. 14, 2023

Related U.S. Application Data

(63) Continuation of application No. PCT/CN2021/118500, filed on Sep. 15, 2021.

(30) Foreign Application Priority Data

Nov. 20, 2020 (CN) ........................ 202011315350.9

(51) Int. Cl.

*B65G 1/137* (2006.01)
*G05D 1/00* (2006.01)
*G06Q 10/087* (2023.01)

(52) U.S. Cl.

CPC ......... *B65G 1/1373* (2013.01); *G05D 1/0212* (2013.01); *G05D 1/0238* (2013.01); *G06Q 10/087* (2013.01)

(58) Field of Classification Search

CPC ...... B65G 1/1373; B65G 1/0435; B65G 1/04; B65G 1/137; B65G 1/14; G06Q 10/087

See application file for complete search history.

(56) References Cited

U.S. PATENT DOCUMENTS 3,826,349 A 7/1974 Stevenson
9,120,622 B1 * 9/2015 Elazary ................ B65G 1/1373

(Continued)

FOREIGN PATENT DOCUMENTS

CN 104106081 A 10/2014
CN 108609334 A * 10/2018 ........... B65G 1/1373

(Continued)

OTHER PUBLICATIONS

CN111017460_EN_description_with_paragraph_numbers_espacenet (Year: 2020).*

(Continued)

*Primary Examiner* — Jacob S. Scott
*Assistant Examiner* — Erin Morris
(74) *Attorney, Agent, or Firm* — Slater Matsil, LLP

(57) ABSTRACT

Provided in this embodiment of the present disclosure are a method and device for storing goods, a robot, a warehousing system and a storage medium. The method for storing goods includes: moving to a target position according to a storage instruction for goods to be stored; detecting a storage space corresponding to the storage instruction, where the storage space for the goods to be stored is determined according to size information of the goods to be stored and a dynamic goods storage space on a rack corresponding to the goods to be stored; determining, according to the detection result, whether the storage space corresponding to the storage instruction includes continuous vacant spaces of preset size; and storing the goods to be stored in the vacant spaces of the preset size of the storage space in response to determining that the storage space corresponding to the storage instruction includes the continuous vacant spaces of the preset size. The storage space is detected before the goods are stored so as to determine that the storage space is enough to store the goods. The safety for goods storage is improved.

20 Claims, 8 Drawing Sheets

(56) References Cited

U.S. PATENT DOCUMENTS

| | | | | |
|---|---|---|---|---|
| 10,071,856 | B2 * | 9/2018 | Hance | B65G 1/0492 |
| 10,899,015 | B2 * | 1/2021 | Barth | B25J 9/1664 |
| 2019/0389671 | A1 * | 12/2019 | Cohen | B65G 1/0492 |

FOREIGN PATENT DOCUMENTS

| | | | | | |
|---|---|---|---|---|---|
| CN | 209522152 | U | | 10/2019 | |
| CN | 110525855 | A | | 12/2019 | |
| CN | 110525860 | A | | 12/2019 | |
| CN | 110615223 | A | | 12/2019 | |
| CN | 110834897 | A | * | 2/2020 | B65G 43/00 |
| CN | 111017460 | A | * | 4/2020 | B65G 1/0492 |
| CN | 111137610 | A | * | 5/2020 | B65G 1/1373 |
| CN | 111158236 | A | | 5/2020 | |
| CN | 111348361 | A | | 6/2020 | |
| CN | 111348362 | A | | 6/2020 | |
| CN | 211197464 | U | | 8/2020 | |
| CN | 111674817 | A | * | 9/2020 | G06T 7/70 |
| CN | 111724541 | A | | 9/2020 | |
| CN | 111792249 | A | * | 10/2020 | B65G 1/0485 |
| CN | 111798183 | A | * | 10/2020 | G06Q 10/047 |
| CN | 112407722 | A | | 2/2021 | |
| CN | 112407726 | A | | 2/2021 | |
| CN | 112407727 | A | | 2/2021 | |
| EP | 3352118 | A1 | * | 7/2018 | B25J 9/162 |
| JP | H0881023 | | * | 3/1996 | |
| JP | H0881023 | A | | 3/1996 | |
| JP | H10139116 | | * | 5/1998 | |
| JP | H10139116 | A | | 5/1998 | |
| JP | 2005138956 | A | | 6/2005 | |
| JP | 4414194 | B2 | * | 2/2010 | |
| JP | 2018020423 | A | * | 2/2018 | B65G 1/1375 |
| TW | 202016000 | A | | 5/2020 | |

OTHER PUBLICATIONS

CN111792249_EN_description_with_paragraph_numbers_espacenet (Year: 2020).*

The International Search Report mailed Nov. 12, 2021; PCT/CN2021/118500.

* cited by examiner

METHOD AND DEVICE FOR STORING GOODS, ROBOT, WAREHOUSING SYSTEM AND STORAGE MEDIUM

CROSS-REFERENCE TO RELATED APPLICATIONS

The present disclosure is a continuation of International Patent Application No. PCT/CN2021/118500 filed on Sep. 15, 2021, which claims priority of Chinese Patent Application No. 202011315350.9 filed with the Chinese Patent Office on Nov. 20, 2020 and entitled "METHOD AND DEVICE FOR STORING GOODS, ROBOT, WAREHOUSING SYSTEM AND STORAGE MEDIUM", which are incorporated herein by references in their entireties.

TECHNICAL FIELD

The present disclosure relates to the technical field of intelligent warehousing, and in particular to a method and device for storing goods, a robot, a warehousing system and a storage medium.

BACKGROUND

Intelligent warehousing systems based on warehousing robots use an intelligent operating system to automatically take out and store goods by means of system instructions, and can continuously run for 24 hours, replacing manual management and operation and improving the warehousing efficiency and thus being widely used and favored.

In general, the warehousing robot needs to place corresponding goods on the preselected storage locations of racks according to the task instruction of a warehouse management apparatus of the warehousing system. However, due to errors of manual operations, or measurement errors of the warehousing system or the warehousing robot, the preselected storage locations may be partially occupied when the goods are stored.

In the prior art, the storage condition of each storage location is determined usually by a manual regular inspection mode, so that the goods are directly stored without detection of the storage locations when the goods are deposited, and the warehousing risk is higher because the storage of the storage locations is not detected in real time.

SUMMARY

The present disclosure provides a method and device for storing goods, a robot, a warehousing system and a storage medium. Real-time detection on storage spaces is realized before goods are stored, and the storage safety for the goods is improved.

In a first aspect, this embodiment of the present disclosure provides a method for storing goods. The method includes: moving to a target position according to a storage instruction for goods to be stored; detecting a storage space corresponding to the storage instruction, where the storage space for the goods to be stored is determined according to size information of the goods to be stored and a dynamic goods storage space on a rack corresponding to the goods to be stored; determining, according to the detection result, whether the storage space corresponding to the storage instruction includes a continuous vacant space of a preset size; and storing the goods to be stored in the vacant space of the preset size of the storage space in response to determining that the storage space corresponding to the storage instruction includes the continuous vacant space of the preset size.

Optionally, the storage instruction includes information of a datum point, and the moving to a target position according to a storage instruction for goods to be stored includes: moving to a first position corresponding to the datum point according to the information of the datum point; and moving to the target position from the first position.

Optionally, the storage instruction includes position information of the storage space and information of a datum point, the moving to a target position according to a storage instruction for goods to be stored includes: moving to a target rack corresponding to the storage space according to the position information of the storage space; and adjusting the position according to the information of the datum point of the target rack so as to move to the target position according to the adjusted position.

Optionally, after determining that the storage space corresponding to the storage instruction includes a continuous vacant space of a preset size, the method further includes: determining information of a datum point in the detection result; determining a second position according to the information of the datum point, where a distance between the second position and the datum point is smaller than or equal to a distance between the target position and the datum point; and moving to the second position.

Optionally, the datum point includes one or more of a column of a target rack, a marking point of the target rack, and one or more goods placed at adjacent positions of the storage space.

Optionally, the detecting a storage space corresponding to the storage instruction includes: detecting a storage space corresponding to the storage instruction by means of a sensor arranged on the robot.

Optionally, the sensor includes at least one of a laser sensor, a 2D camera and a 3D camera.

Optionally, the determining, according to the detection result, whether the storage space includes a continuous vacant space of a preset size includes: determining, according to the detection result, whether the storage space includes the continuous vacant space of the preset size which take a preset point of the storage space as a center.

Optionally, the determining, according to the detection result, whether the storage space includes a continuous vacant space of a preset size includes: determining, according to the detection result, a spatial size of a largest vacant space of the storage space; and determining whether the spatial size of the largest vacant space is greater than or equal to the preset size so as to determine whether the storage space includes the continuous vacant space of the preset size.

Optionally, the detecting a storage space corresponding to the storage instruction includes: detecting a first preset range in the storage space corresponding to the storage instruction, the first preset range being in accord with the preset size; and correspondingly, the determining, according to the detection result, whether the storage space includes a continuous vacant space of a preset size includes: determining whether an obstacle exists in a first preset range to determine whether the storage space includes the continuous vacant space of the preset size.

Optionally, the storage instruction includes size information of the goods to be stored, and before determining, according to the detection result, whether the storage space includes a continuous vacant space of a preset size, the method further includes: determining, according to the size information of the goods to be stored, the preset size of the vacant space corresponding to the goods to be stored.

Optionally, the preset size is the sum of the size information of the goods to be stored and a preset safety size.

Optionally, after determining, according to the detection result, whether the storage space corresponding to the storage instruction includes a continuous vacant space of a preset size, the method further includes: generating abnormity prompt information in response to determining that the storage space corresponding to the storage instruction does not include the continuous vacant space of the preset size.

Optionally, the storage space includes an obstacle, and after determining, according to the detection result, whether the storage space corresponding to the storage instruction includes a continuous vacant space of a preset size, the method further includes: removing the obstacle in the storage space in response to determining that the storage space corresponding to the storage instruction does not include the continuous vacant space of the preset size; acquiring second detection information of the storage space in which the obstacle has been removed; determining, according to the second detection information, whether the storage space in which the obstacle has been removed includes the continuous vacant space of the preset size; and storing the goods to be stored in the continuous vacant space of the preset size of the storage space in which the obstacle has been removed in a case that the storage space in which the obstacle has been removed includes the vacant space of the preset size.

Optionally, the removing the obstacle in the storage space includes: recognizing the obstacle of the storage space, and determining whether the obstacle is a removable object; and removing the obstacle from the storage space in a case that the obstacle is a removable object.

Optionally, the determining whether the obstacle is a removable object includes:

determining whether the obstacle is a removable object according to whether the obstacle is a recorded object.

Optionally, the determining whether the obstacle is a removable object according to whether the obstacle is a recorded object includes: determining whether the obstacle is a removable object according to the object size of the obstacle in a case that the obstacle is an unrecorded object; acquiring placement information of a recorded object in a case that the obstacle is the recorded object; and determining, according to the placement information, whether the obstacle is a removable object.

Optionally, the determining, according to the placement information, whether the obstacle is a removable object includes: determining, according to a placement angle in the placement information, whether the obstacle is a removable object in a case that goods spacing in the placement information meets preset safety spacing; and determining that the obstacle is an unremovable object, and marking the storage space as an abnormal storage location in a case that the goods spacing in the placement information does not meet the preset safety spacing.

Optionally, after determining, according to the detection result, whether the storage space corresponding to the storage instruction includes a continuous vacant space of a preset size, the method further includes: acquiring checking information of at least one adjacent goods in a second preset range of the storage space in response to determining that the storage space corresponding to the storage instruction does not include the continuous vacant space of the preset size; determining, according to the checking information of the at least one adjacent goods, whether condemned goods exist in the at least one adjacent goods; and adjusting the condemned goods in a case that condemned goods exist in the at least one adjacent goods.

Optionally, the acquiring checking information of at least one adjacent goods in a second preset range of the storage space includes: successively acquiring checking information of various adjacent goods in the preset second range according to a sequence of a distance in the storage space from near to far.

Optionally, after determining, according to the detection result, whether the storage space corresponding to the storage instruction includes a continuous vacant space of a preset size, the method further includes: executing a storage or take-out task of first goods in response to determining that the storage space corresponding to the storage instruction does not include the continuous vacant space of the preset size, where the first goods are goods except the goods to be stored; and executing storage operation of the goods to be stored in response to detecting the continuous vacant space of the preset size.

Optionally, after storing the goods to be stored in the vacant spaces of the preset size of the storage space, the method further includes: acquiring storage information of the goods to be stored, where the storage information includes one or more of a placement position, pose information and spacing between the goods to be stored and an adjacent object; and sending the storage information of the goods to be stored to a warehouse management apparatus.

In a second aspect, this embodiment of the present disclosure further provides a device for storing goods. The device includes:

a moving module, configured to move to a target position according to a storage instruction for goods to be stored; a detecting module, configured to detect a storage spaces corresponding to the storage instruction, where the storage space for the goods to be stored is determined according to size information of the goods to be stored and a dynamic goods storage space on a rack corresponding to the goods to be stored; a space determining module, configured to determine, according to the detection result, whether the storage space includes continuous vacant spaces of preset size; and a goods storage module, configured to store the goods to be stored in the vacant spaces of the preset size of the storage spaces in a case that the storage space corresponding to the storage instruction includes the continuous vacant spaces of the preset size.

In a third aspect, this embodiment of the present disclosure further provides a robot, including a memory and at least one processor, where the memory stores a computer-executable instruction; and the at least one processor executes the computer-executable instruction stored by the memory such that the at least one processor executes the method for storing goods provided by any embodiment corresponding to the first aspect of the present disclosure.

In a fourth aspect, this embodiment of the present disclosure further provides a warehousing system, including the robot provided by an embodiment corresponding to the third aspect of the present disclosure, a warehouse management apparatus and a rack, where the rack is configured to store goods; and the warehouse management apparatus is configured to generate a storage instruction for the goods.

In a fifth aspect, this embodiment of the present disclosure further provides a computer-readable storage medium, where the computer-readable storage medium stores a computer-executable instruction, and the processor, when executing the computer-executable instruction, implements the method for storing goods provided by any embodiment corresponding to the first aspect of the present disclosure.

In a sixth aspect, this embodiment of the present disclosure further provides a computer program product, including a computer program, and the method for storing goods provided by any embodiment of the present disclosure is implemented when the computer program is executed by the processor.

According to the method and device for storing goods, the robot, the warehousing system and the storage medium provided by this embodiment of the present disclosure, after the robot moves to the target position according to the storage instruction and before the goods to be stored are stored in the corresponding storage space of the rack, the storage space is detected, whether enough continuous vacant spaces exist in the storage space is determined according to the detection result, if enough continuous vacant spaces exist in the storage space, the goods to be stored are placed in the vacant spaces of the storage space, real-time detection on storage location spaces before the goods are stored, when enough spaces exist, the goods are stored, and thus, the storage safety for goods is improved.

BRIEF DESCRIPTION OF THE DRAWINGS

Accompanying drawings herein are incorporated into a specification and constitute a part of this specification, show embodiments that conform to the present disclosure, and are used for describing a principle of the present disclosure together with this specification.

Specific embodiments of the present disclosure have been shown by the above-described drawings and will be described in more detail hereinafter. The accompanying drawings and literal descriptions are not intended to limit the scope of the idea of the present disclosure in any manner, but explain the concept of the present disclosure by referring to specific embodiments for a person skilled in the art.

DETAILED DESCRIPTION

Exemplary embodiments will be described in detail herein, examples of which are represented in the accompanying drawings. When the following description relates to the accompanying drawings, the same numerals in different accompanying drawings indicate the same or similar elements, unless otherwise indicated. The modes of implementation described in the following exemplary embodiments do not represent all modes of implementation that are consistent with the present disclosure. On the contrary, they are only examples of devices and methods that are consistent with some aspects of the present disclosure, as described in detail in the appended claims.

The technical solutions of the present disclosure and how the technical solutions of the present disclosure solve the technical problems described above are described in detail below in terms of specific embodiments. These several specific embodiments may be combined with each other below, and details of the same or similar concepts or processes may not be repeated in some embodiments. Embodiments of the present disclosure will be described below with reference to the accompanying drawings.

The following explains an application scenario of this embodiment of the present disclosure:

the present disclosure is applied to a scenario of dynamically configuring goods storage spaces, and provides a goods placement method for dynamically configuring goods storage spaces, which are different from fixed storage locations.

Dynamic configuration of storage spaces for goods refers to: after a system determines goods to be stored, according to the size of the goods, a first storage space matched with the size of the goods is allocated from the existing unoccupied space, where the unoccupied space can be any space, and the unoccupied space does not include divided fixed storage locations; and the first storage space can contain the goods to be stored, the fixed storage location refers to a preset storage location in a warehouse, and the fixed storage location is fixed in position and determined in size.

A dynamic goods storage space may be a space through which goods storage spaces are dynamically configured.

Exemplarily, a one-dimensional configuration mode and/or two-dimensional configuration mode are/is applied to dynamical configuration of the goods storage spaces at least.

Figure 1A:
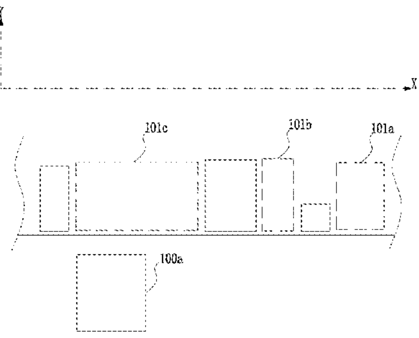
FIG. 1A is a schematic diagram of storage in a one-dimensional configuration mode provided by an embodiment of the present disclosure.

Exemplarily, FIG. 1A is a schematic diagram of a storage situation in a one-dimensional configuration mode according to an embodiment of the present disclosure, and as understood by referring to an X-Y coordinate system, the one-dimensional configuration mode means that goods on each layer in a goods storage space can be placed in a row only in a depth Y direction, where in the one-dimensional mode, the goods storage space includes a first unoccupied space and/or a first occupied space, and specifically, the first occupied space is a space where goods have been placed in a goods entering and exiting direction.

Figure 1B:
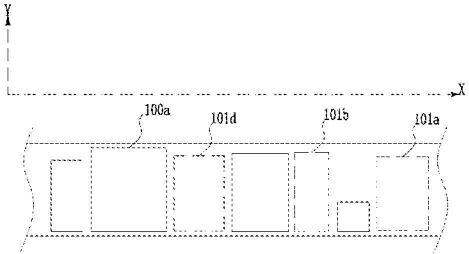
FIG. 1B is a schematic diagram of storage after goods are placed provided by the embodiment as shown in FIG. 1A of the present disclosure.
Figure 1C:
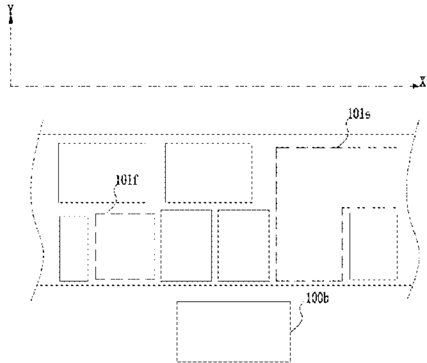
FIG. 1C is a schematic diagram of storage in a two-dimensional configuration mode provided by an embodiment of the present disclosure.

Exemplarily, FIG. 1C is a schematic diagram of a storage situation in a two-dimensional configuration mode according to an embodiment of the present disclosure, and as understood by referring to an X-Y coordinate system, the two-dimensional configuration mode means that goods on each layer in the goods storage space may be placed in one row, in multiple rows, or in one row and multiple rows alternately in the depth Y direction. That is, in the two-dimensional configuration mode, the goods in the goods storage space are allowed to be placed in multiple rows in the depth Y direction, where in the two-dimensional mode, the goods storage space includes a second unoccupied space and/or a second occupied space, and specifically, the second unoccupied space includes a space unoccupied by the goods in the goods entering and exiting direction.

For example, FIG. 1A is a schematic diagram of a storage situation in a one-dimensional configuration mode according to an embodiment of the present disclosure, in the one-dimensional configuration mode, as shown in FIG. 1A, with regard to spaces unoccupied when the goods storage spaces are dynamically configured, like spaces 101*a*, 101*b* and 101*c* in FIG. 1A. After the system confirms the goods to be stored, like goods 100*a*, a first storage space which is mostly matched with the goods 100*a* will be found out from unoccupied spaces, namely the spaces 101*a*, 101*b* and 101*c*, for example, the space 101*c*.

FIG. 1B is a schematic diagram of storage after goods are placed according to an embodiment as shown in FIG. 1A of the present disclosure, as shown in FIG. 1B, after placement of the goods 100*a*, currently unoccupied spaces are spaces 101*a*, 101*b* and 101*d*, where the space 101*d* is a newly defined unoccupied space after the space 101*c* is partially occupied by the goods 100*a*.

FIG. 1C is a schematic diagram of storage in a two-dimensional configuration mode according to an embodiment of the present disclosure, as shown in FIG. 1C, for the two-dimensional configuration mode, the unoccupied spaces on the racks are indicated as a space 101*e* and a space 101*f* in FIG. 1C. After the system confirms the goods to be stored, like goods 100*b*, a first storage space which is mostly matched with the goods 100*b* will be found out from the unoccupied spaces, namely the space 101*e* and the space 101*f*, for example, the space 101*e*.

Figure 1D:
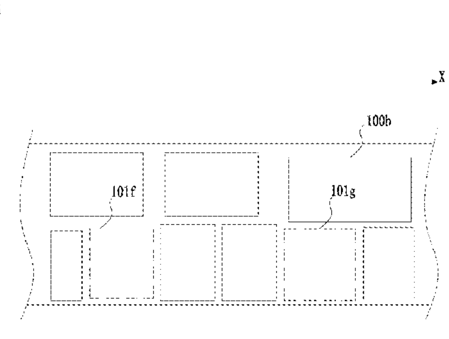
FIG. 1D is a schematic diagram of storage after goods are placed in the embodiment corresponding to FIG. 1C of the present disclosure.

FIG. 1D is a schematic diagram of storage after goods are placed according to an embodiment corresponding to FIG. 1C of the present disclosure, as shown in FIG. 1D, after placement of the goods 100*b*, the currently unoccupied spaces are a space 101*f* and a space 101*g*. The space 101*g* is a newly defined unoccupied space after the space 101*e* is partially occupied by the goods 100*b*.

Figure 1E:
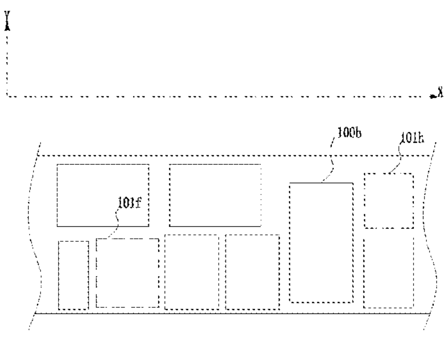
FIG. 1E is a schematic diagram of storage after goods are placed in the embodiment corresponding to FIG. 1C of the present disclosure.

FIG. 1E is a schematic diagram of storage after goods are placed according to an embodiment corresponding to FIG. 1C of the present disclosure, referring to FIG. 1C, FIG. 1D and FIG. 1E, it is known that the orientation of the goods 100*b* in FIG. 1D is different from the orientation of the goods 100*b* in FIG. 1E, that is, the goods 100*b* can be steered when placed, the orientation of the goods to be stored can be changed when placed, and after the goods 100*b* is placed, the currently unoccupied spaces are spaces 101*f* and 101*h*. The space 101*h* is a newly defined unoccupied space after the space 101*e* is partially occupied by the goods 100*b*.

Figure 1F:
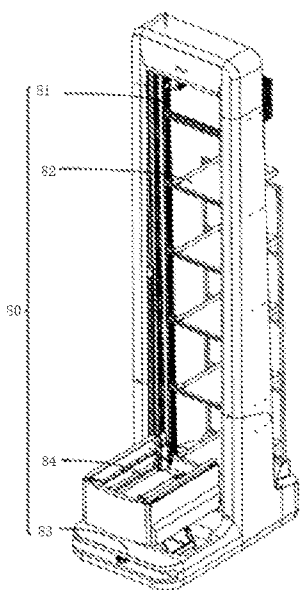
FIG. 1F is a schematic structural diagram of a robot provided by an embodiment of the present disclosure.

Exemplarily, the FIG. 1F is a schematic structural diagram of a robot provided by an embodiment of the present disclosure; and as shown in FIG. 1F, the robot 80 includes a mobile chassis 83, a storage rack 82, a carrying device 84 and a lifting/lowering assembly 81. The storage rack 82, the carrying device 84 and the lifting/lowering assembly 81 are mounted on the mobile chassis 83, and a plurality of storage units are arranged on the storage rack 82. The lifting/lowering assembly 81 is configured to drive the carrying device 84 to ascend and descend, so that the carrying device 84 is aligned with any storage unit on the storage rack 82, or is aligned with a rack and/or goods. The carrying device 84 can rotate around a vertical direction to adjust the orientation so as to be aligned with the storage units, or aligned with the rack and/or goods. The carrying device 84 is configured to load or unload goods so as to carry the goods between the rack and the storage units.

Exemplarily, the storage rack 82 may be optionally configured or not be configured, and when the storage rack 82 is not configured, in the goods carrying period of the robot 80, the goods are stored in an accommodating space of the carrying device 84.

The robot 80 in the embodiment may execute the method for storing goods of the present disclosure so as to carry goods between the rack and an operation platform.

In a process of executing a goods storage task by the robot 80, the robot 80 moves to the position of a designated storage space for the goods, and the lifting/lowering assembly 81 is matched with the carrying device 84 to carry the goods from the storage units of the storage rack 82 to a rack.

Figure 1G:
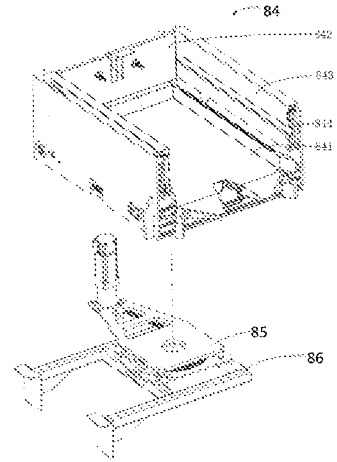
FIG. 1G is a schematic structural diagram of a carrying device in the embodiment as shown in FIG. 1F of the present disclosure.

Exemplarily, FIG. 1G is a schematic structural diagram of a carrying device in an embodiment as shown in FIG. 1F of the present disclosure.

Exemplarily, the carrying device 84 is mounted on a bracket 86 by means of a rotating mechanism 85, and the rotating mechanism 85 is configured to drive the carrying device 84 to rotate around a vertical axis with respect to the bracket 86 to be aligned with the storage unit, or aligned with the rack and/or the goods. The carrying device 84 is configured to carry the goods between the storage unit and the rack. If the carrying device 84 is not aligned with the rack and/or the goods, the carrying device 84 can be driven by the rotation mechanism 85 to rotate with respect to the bracket 86 to ensure that the carrying device 84 is aligned with the rack and/or the goods.

Figure 1H:
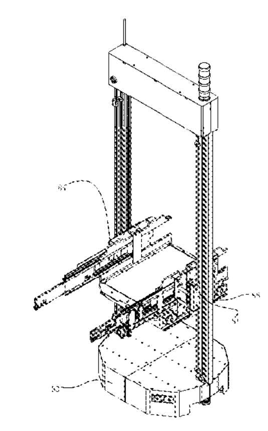
FIG. 1H is a structure of a robot and a carrying device thereof in the embodiment as shown in FIG. 1F of the present disclosure.

FIG. 1H is structures of a robot and a carrying device thereof in an embodiment as shown in FIG. 1F of the present disclosure. As will be understood from FIG. 1F and FIG. 1G, according to physical truth, the rotary mechanism 85 may be omitted, for example, the robot 80 may move along a fixed track, and after the robot moves to the vicinity of the rack, the carrying device 84 may be aligned with the rack and/or the goods, and the goods may be arranged in the taking direction of the carrying device 84.

Figure 1I:
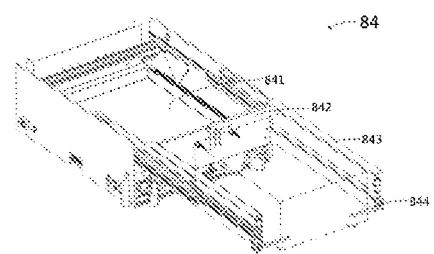
FIG. 1I is a schematic structural diagram of a carrying device in the embodiment as shown in FIG. 1F of the present disclosure.

Exemplarily, FIG. 1I is a schematic structural diagram of a carrying device in an embodiment as shown in FIG. 1F of the present disclosure, please refer to FIG. 1G for understanding. As shown in FIG. 1I, the carrying device 84 includes a supporting plate 841 and a telescopic arm assembly. The supporting plate 841 is configured to support goods and may be a flat plate arranged horizontally. The telescopic arm assembly is configured to push the goods placed on the supporting plate 841 out of the supporting plate 841 or pull the goods to the supporting plate 841. The telescopic arm assembly includes a telescopic arm 843, a fixed push rod 842 and a movable push rod 844. The telescopic arm 843 includes a left telescopic arm and a right telescopic arm, the telescopic arm 843 can be horizontally extended, in a direction perpendicular to the extension of the telescopic arm 843 and parallel to the supporting plate 841, and the telescopic arm 843 is located on one side of the supporting plate 841. The telescopic arm 843 is powered by an electric motor and the power is transmitted by a chain wheel mechanism, and the chain wheel mechanism can be replaced by a transmission mechanism such as a belt pulley mechanism and a lead screw mechanism, depending on the actual situation. The fixed push rod 842 and the movable push rod 844 are both mounted on the telescopic arm 843 and the fixed push rod 842 and movable push rod 844 can be extended together with the telescopic arm 843. The fixed push rod 842 and the supporting plate 841 are located on the same side of the telescopic arm 843, and the fixed push rod 842 is configured to push the goods out of the supporting plate 841 when the telescopic arm 843 is extended. The movable push rod 844 can be retracted into the telescopic arm 843 and when the movable push rod 844 is not retracted into the telescopic arm 843, the movable push rod 844, the fixed push rod 842 and the supporting plate 841 are all located on the same side of the telescopic arm 843 and the movable push rod 844 is located in the direction of the extension of the fixed push rod 842 along the telescopic arm 843. The movable push rod 844 can be driven directly by an electric motor, or, depending on the actual situation, the power can be transmitted by a transmission mechanism such as a gear set or a linkage mechanism. The movable push rod 844 is configured to pull the goods to the supporting plate 841 when the movable push rod 844 is not retracted into the telescopic arm and the telescopic arm 843 is retracted.

Exemplarily, the fixed push rod 842 of the carrying device 84 may be designed as a finger pole structure as the movable push rod 844.

Exemplarily, the carrying device 84 may be designed as a structure with adjustable spacing width of the telescopic arm assembly. When goods are taken/stored, the spacing width of the telescopic arm assembly may be adjusted on the basis of the size of the goods.

Figure 1J:
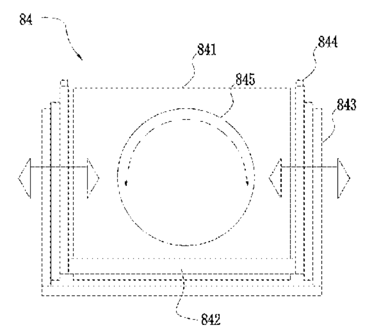
FIG. 1J is a schematic structural diagram of another carrying device in the embodiment as shown in FIG. 1I of the present disclosure.

Exemplarily, the carrying device 84 may further include a steering structure, such as a rotating disk, and the steering structure may be configured to change the orientation of the goods placed on the supporting plate 841 thereof. FIG. 1J is a schematic structural diagram of another carrying device in an embodiment as shown in FIG. 1I of the present disclosure, as can be seen in conjunction with FIG. 1J and FIG. 1I, the carrying device 84 may also include a steering structure, namely the rotary plate 845 in FIG. 1I, so as to change the orientation of goods placed on the supporting plate 841.

Figure 1K:
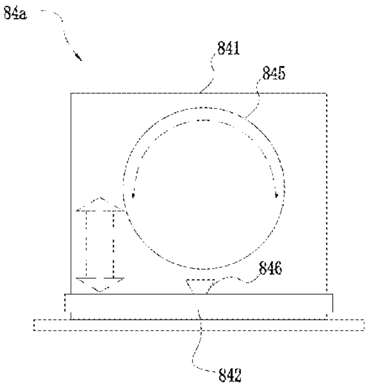
FIG. 1K is a schematic structural diagram of another carrying device in the embodiment as shown in FIG. 1F of the present disclosure.

Exemplarily, FIG. 1K is a schematic structural diagram of another carrying device of an embodiment as shown in FIG. 1F, the carrying device 84*a* includes one or more suction cups 846, which is arranged on the fixed push rod 842, and the fixed push rod 842 may be rod-shaped or plate-shaped. The fixed push rod 842 can be driven to displace back and forth in the direction facing the goods and/or the rack when the goods are stored/taken. Goods are absorbed by means of the suction cups 846, the goods are carried to the rack or to the supporting plate 841 in cooperation with movement of the fixed push rod 842.

Figure 1L:
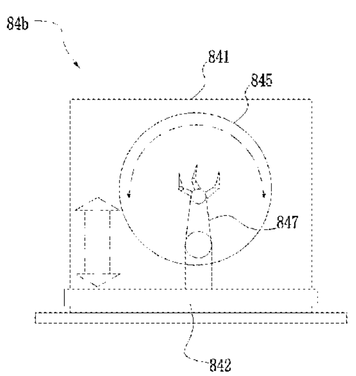
FIG. 1L is a schematic structural diagram of another carrying device in the embodiment as shown in FIG. 1F of the present disclosure.

Exemplarily, FIG. 1L is a structure of another carrying device of an embodiment as shown in FIG. 1F of the present disclosure, the carrying device 84*b* includes one or more robotic arms 847, which is arranged at a proper position on the fixed push rod 842 and/or the carrying device 84*b*. The fixed push rod 842 can be driven to displace back and forth in the direction facing the goods and/or the rack when the goods are stored/taken. The goods are grabbed/hooked by the robotic arm 847, and then the goods are carried to the rack or the goods are carried to the supporting plate 841 in conjunction with the displacement of the fixed push rod 842.

Exemplarily, the carrying device (84*a*, 84*b*) may also include a steering structure, such as the rotating disk 845 in FIGS. 1J and 1K, to change the orientation of the goods placed on the supporting plate 841 thereof.

The structure of the carrying device of an embodiment of the present disclosure may include a combination of one or more of the above examples.

The beneficial effects lie in that, compared with the telescopic arm, structures such as the suction cups and the robotic arm are utilized, the safety spacing between goods may be reduced, then goods density on the racks of a warehousing system is improved, space utilization rate is increased, and warehousing cost is reduced.

Figure 2:
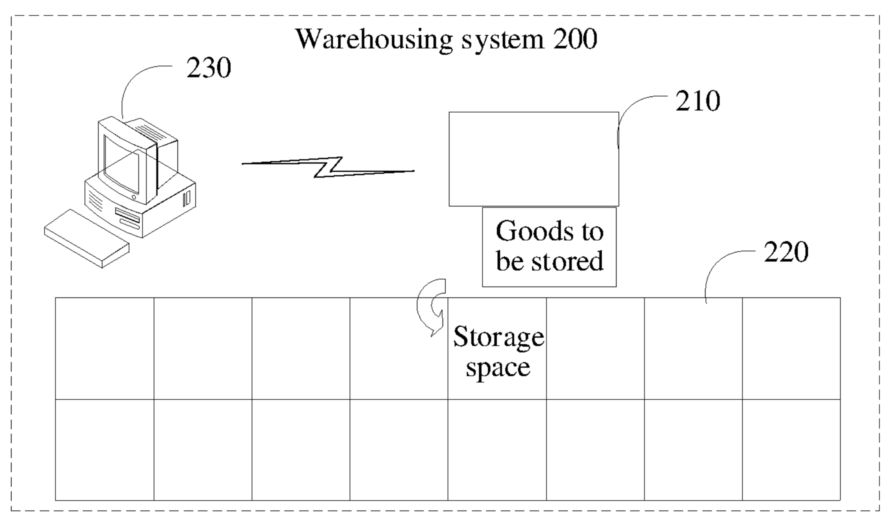
FIG. 2 is a diagram of an application scenario of a method for storing goods provided by an embodiment of the present disclosure.

FIG. 2 is a diagram of an application scenario of a method for storing goods provided by an embodiment of the present disclosure, as shown in FIG. 2, the method for storing goods provided by this embodiment of the present disclosure may run on the robot of the warehousing system. The warehousing system 200 utilizes the robot 210 to take and/or store the goods to be stored on a rack 220, a warehouse management apparatus 230 is utilized to carry out path planning, status monitoring, dispatching and the like on the robot 210, so that the robot 210 moves to a set position to take or store the goods to be stored, the warehouse management apparatus 230 further may store the storage information of various storage locations of the rack 220 and the basic information of corresponding goods, so as to facilitate warehouse management. When the warehouse management apparatus 230 receives a storage requirement of the goods to be stored, the warehouse management apparatus 230 may distribute corresponding storage spaces for the goods to be stored, then generates a storage instruction for the goods to be stored, and sends the storage instruction to the robot 210, and the robot 210 places the goods to be stored in the storage space of the rack 220 according to the storage instruction.

However, the robot in the prior art can only simply move and store goods according to a storage instruction, and cannot detect a storage space in real time before the goods are stored, so that the goods storage risk is high. When storage spaces are not enough, for example, deviation exists during placement of goods of adjacent storage locations of the storage spaces, then potential safety hazards exist during storage of the goods to be stored, the robot may damage the goods to be stored when the goods to be stored are stored, or the rack topples and falls even.

In order to improve safety of inbound or storage of the goods, the present disclosure provides a method for storing goods, whether a storage space includes enough continuous vacant spaces is detected before storage or inbound of the goods, and if the storage space includes enough continuous vacant spaces, then the goods can be stored in the storage space.

Figure 3:
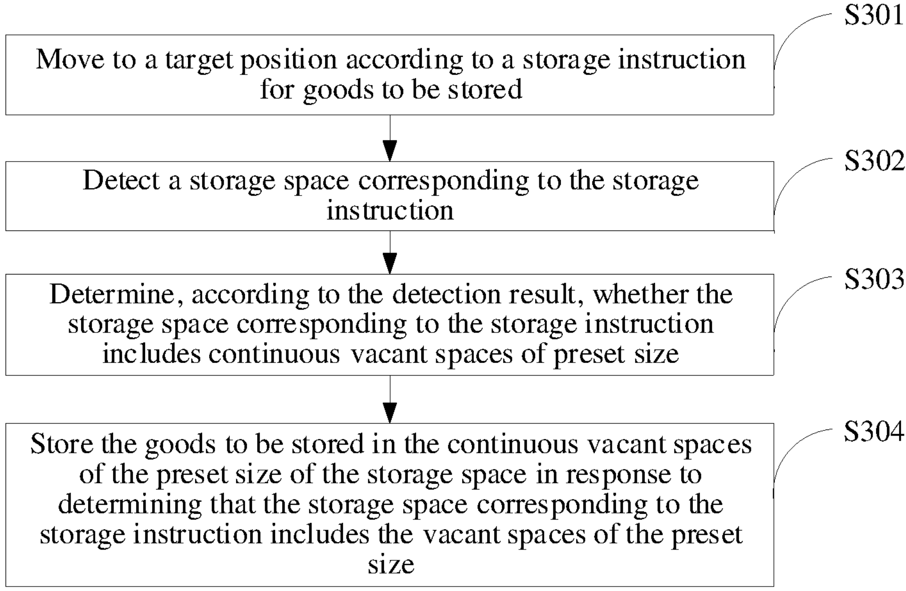
FIG. 3 is a flowchart of the method for storing goods provided by an embodiment of the present disclosure.

FIG. 3 is a flowchart of a method for storing goods provided by an embodiment of the present disclosure, as shown in FIG. 3, the method for storing goods may be executed by a warehousing robot or a robot of the warehousing system. The method for storing goods provided by this embodiment includes the following steps:

step S301, the robot moves to a target position according to the storage instruction for the goods to be stored.

The goods to be stored are any goods needing to be stored on the rack of the warehousing system, and may be goods boxes, customer supplied packing cases, parcels and the like. The storage instruction is generated by the warehouse management apparatus of the warehousing system, and may be specifically generated by the warehouse management apparatus according to the storage of a warehouse and the basic information of the goods to be stored, and the basic information includes the size information of the goods to be stored and information such as number and type of the goods to be stored. The storage instruction may include position information and height information of the storage space, and may further include goods identifier of the goods to be stored, size information of the goods to be stored or robot identifier of the robot and the like. The target position may be a set distance ahead of the position information of the storage space for the goods to be stored in the storage instruction, for example, 20 cm ahead. The specific position of the target position may be determined according to structure characteristic of the robot.

Exemplarily, a three-dimensional coordinate system is established by taking the warehouse-out position of the warehouse as a coordinate origin, the position coordinate corresponding to the position information of the storage space can be (10.5, 5, 2), and it indicates that the height of the storage space from the ground is 2 meters, the transverse distance from the storage space to the warehouse-out position is 10.5 meters, and the longitudinal distance is 5 meters. The position information of the storage space may also be "S1 L3 5", it indicates that the target rack is the 5th storage location on the 3rd layer of the S1 rack.

Specifically, the three-dimensional coordinate system of the space where the warehouse is located can be established by taking the set position of the warehouse of the warehouse system as the coordinate origin, and then the position coordinates corresponding to the position information of various storage locations are determined on the basis of the three-dimensional coordinate system.

Further, the position information of the storage space may be the position information of a set point of the storage space, the set point may be any vertex or center point of the cube region where the storage space is located, such as a bottom center point and a bottom left corner vertex.

Specifically, with regard to various racks in the present disclosure, the goods storage spaces are planned by using a goods placement method for dynamically configuring the goods storage spaces, and the size of the storage spaces corresponding to the goods to be stored is determined according to the actual size of the goods to be stored, so that the racks can be divided into storage spaces of any size according to the actual size of each goods, and the storage spaces corresponding to different goods are different in size.

Specifically, the robot receives the storage instruction from the warehouse management apparatus, moves according to the position information of the storage space in the storage instruction, and moves to the target position corresponding to the storage instruction.

Specifically, before or after receiving the storage instruction, the method further includes: taking the goods to be stored to a supporting plate of the carrying device or into storage units of the robot by means of the carrying device of the robot, or manually placing the goods to be stored to the supporting plate of the carrying device of the robot or into the storage units of the robot. Then, the goods to be stored are transported to the target position according to the storage instruction.

Further, the storage space is specifically determined by the warehouse management apparatus of the warehousing system according to the size information of the goods to be stored and storages of various racks of the warehouse, and the size information may include the length of the goods to be stored, and may further include at least one of width and height. If the size information only includes length, then the length of the storage space is at least the sum of the length of the goods to be stored and a preset safety length. If the size information includes length and width, then the length of the storage space is at least the sum of the length of the goods to be stored and the preset safety length, and the width of the storage space is the sum of the width of the goods to be stored and a preset safety width. Correspondingly, if the size information includes height, then the height of the rack corresponding to the storage space should be at least the sum of the height of the goods to be stored and a preset safety height. The preset safety length, the preset safety width and the preset safety height need to be determined by the size information of the carrying device of the robot and corresponding dimension of the goods to be stored.

Figures 4, 5:
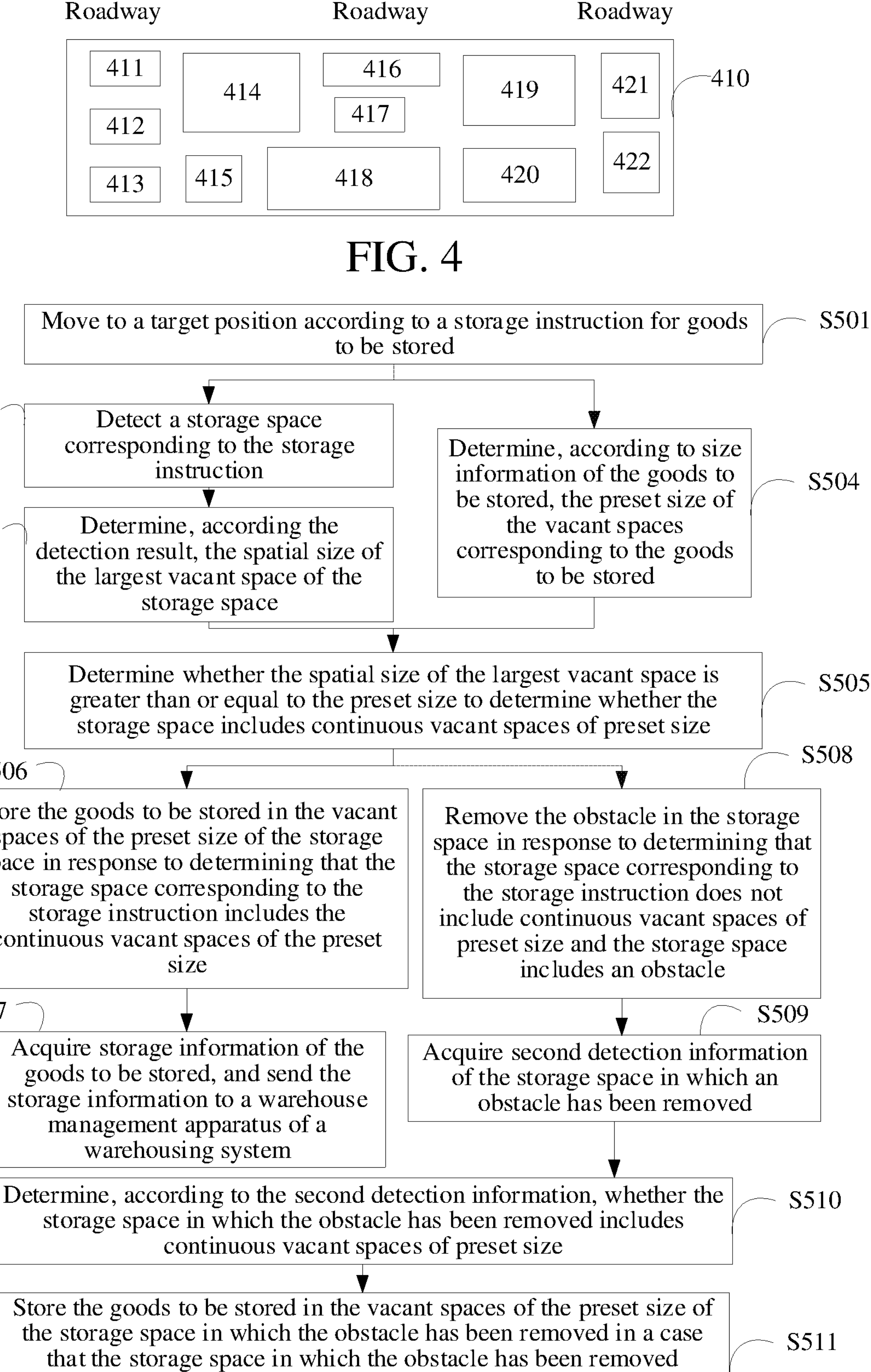
FIG. 4 is a schematic diagram of goods storage of a rack in the embodiment as shown in FIG. 3 of the present disclosure.
FIG. 5 is a flowchart of a method for storing goods provided by another embodiment of the present disclosure.

Specifically, the storage spaces on the rack stored with the goods to be stored are continuous spaces, and may be divided into storage locations of any size smaller than physical size of the spaces. A one-dimensional configuration mode and/or two-dimensional configuration mode may be utilized for goods on the rack, that is, the goods are placed in one row or in multiple rows on a certain layer of the rack. FIG. 4 is a schematic diagram of storage of goods of a rack in an embodiment as shown in FIG. 3, as shown in FIG. 4, goods 411-421 are placed on the rack 410, it can be seen that the size of the storage spaces of goods on the rack are dynamic, and is determined on the basis of the size of the stored goods, and goods of different sizes correspond to storage spaces of different sizes.

Optionally, the storage instruction includes information of a datum point, the step of moving to the target position according to the storage instruction for the goods to be stored, includes: moving to a first position corresponding to the datum point according to the information of the datum point; and moving to the target position from the first position.

The datum point includes one or more: a column of a target rack, a marking point of the target rack, and one or more goods placed at adjacent positions of the storage space. The first position is a position corresponding to the datum point. The information of the datum point may be identifier information and/or position information of the datum point.

The target rack is a rack where the storage space is located. The position information of the storage spaces may be position coordinates of the storage space, and is used to describe the position of the target rack where the storage space is located, and the position of the storage space on the target rack.

The datum point is a set point with known position on the rack. The number of the datum points may be one or more, and specifically needs to be determined according to the position of the goods to be stored. The marking point may be a position point to which a preset mark is attached, and the preset mark may be a two-dimensional code, a circular code, a bar code, an RFID (Radio Frequency Identification) tag, or the like, or may also be a magnetic nail.

Exemplarily, the image of each datum point may be shot by means of a visual sensor of the robot, and then is recognized on the basis of an image recognition arithmetic, and then position information corresponding to the datum point is determined according to the recognition result.

Specifically, a path from the first position corresponding to the datum point to the target position is known, thus, when the robot moves to the first position, the robot may move to the target position from the first position according to the known path.

Optionally, the storage instruction includes position information of the storage space and information of a datum point, the moving to a target position according to a storage instruction for goods to be stored includes: moving to a target rack corresponding to the storage space according to the position information of the storage space; and adjusting the position according to the information of the datum point of the target rack so as to move to the target position according to the adjusted position.

Specifically, when the robot moves to the target rack, current relative position relation between the robot and the datum point may be determined according to the position information of the datum point of the target rack, then the position of the robot is adjusted and corrected according to the relative position relation, the accuracy of the position of the robot is improved, and then the robot continues to move to the target position.

Exemplarily, if the storage space of the goods to be stored is a space adjacent to the column of the rack, when the robot moves to a position corresponding to the target rack, the position of the column of the rack is recognized, the distance between the robot and the column of the rack is determined, the position of the robot is adjusted according to the distance so that the robot is as close to the column as possible, a larger space is reserved for storage of goods, and the space utilization rate of the rack is increased.

Specifically, detection results of datum points of various racks may be acquired by means of a sensor of the robot, and then the position information of the datum points of the racks is determined according to the detection results. The moving direction and moving distance of the robot are determined according to the target position of the goods to be stored and the current position information of the datum points of the rack, and thus, the robot may move to the target position.

Step S302, the storage space corresponding to the storage instruction is detected.

The storage space of the goods to be stored is determined according to the size information of the goods to be stored and a dynamic goods storage space on the rack corresponding to the goods to be stored.

Specifically, after the robot moves to the target position, a detecting device arranged on the robot is started to detect the storage space, and thus, the detection result of the storage space is obtained.

The detecting device may be a sensor, a detector or other devices.

Optionally, the storage space corresponding to the storage instruction may be detected by means of the sensor arranged on the robot so as to obtain the detection result.

The sensor may be arranged on a robot body of the robot, and may also be arranged on the carrying device of the robot. The sensor may be a laser sensor such as laser radar, may also be a visual sensor such as a 2D camera or a 3D camera, and may further be an ultrasonic sensor. The number of the sensors may be one or more.

Optionally, the sensor includes at least one of a laser sensor, a 2D camera and a 3D camera.

Step S303, whether the storage space corresponding to the storage instruction includes continuous vacant spaces of preset size is determined according to the detection result.

The vacant spaces are free spaces without storing any goods or objects. The preset size may be determined according to the size information of the goods to be stored, and the preset size is a size meeting storage of the goods to be stored, and may be the minimum size.

Specifically, when the detection result is a detection result acquired by the laser radar, that is, the detection result is laser signals returned from various points of the storage space, and whether the storage spaces have continuous vacant spaces in preset size may be determined according to amplitude of each laser signal. When the detection result is an image shot by a 2D camera, a detection window of the image is determined according to the preset size, the image is divided into various sub-images according to the detection window, whether the sub-images include continuous vacant spaces of preset size is determined according to a gray value of each point of each sub-image, if at least one sub-image includes continuous vacant spaces of preset size, it is determined that the storage space includes the continuous vacant spaces of the preset size, if all sub-images do not include the continuous vacant spaces of the preset size, it is determined that the storage space does not include the continuous vacant spaces of the preset size. When the detection result is point cloud data, shot by a 3D camera, of the storage space, whether the storage space has continuous vacant spaces of preset size is determined according to coordinates and amplitude of the point cloud data, and then it is determined that the storage space includes the continuous vacant spaces of the preset size. Specifically, the point cloud data of each preset point may be used as the center, a point cloud data set corresponding to a region of a preset size with the preset point as the center is acquired, whether the region corresponding to the point cloud data set includes continuous vacant spaces of preset size is determined according to the amplitude of each point cloud data in each point cloud data set, if the region corresponding to at least one point cloud data set includes the continuous vacant spaces of the preset size, then the storage space includes the continuous vacant spaces of the preset size, and if the regions corresponding to all the point cloud data sets do not include the continuous vacant spaces of the preset size, then the storage spaces do not include the continuous vacant spaces of the preset size.

Optionally, the determining, according to the detection result, whether the storage space includes continuous vacant spaces of preset size includes: determining, according to the detection result, whether the storage space includes continuous vacant spaces of preset size which take a preset point of the storage space as a center.

The number of the preset points may be one or more, and the preset point may be any point of the storage space, for example, the preset point may be the center point of the storage space.

Specifically, the detection results may be divided according to the preset size to obtain detection sub-results taking each preset point as the center, the size of an actual object space corresponding to the detection sub-results is the preset size, then whether regions corresponding to the various detection sub-results are vacant spaces are determined, or whether an obstacle exists in the various detection sub-results is determined, if the region corresponding to at least one detection sub-result is a vacant space, or an obstacle does not exist in at least one detection sub-result, it is determined that the storage space includes the continuous vacant spaces of the preset size.

Further, when continuous vacant spaces of various preset sizes exist, a vacant space which is the closest to the center point of the storage space is determined as a vacant space for placement of the goods to be stored.

Specifically, the various preset points and the detection sequence of the various preset points may be determined in advance, then a detection sub-result that actual physical sizes corresponding to various preset points is the preset size is obtained, where the detection sequence may be determined according to the distance between the preset point and the center point of the storage space, and the closer the distance between the preset point and the center point of the storage space is, the earlier the preset point is detected. The various detection sub-results are successively analyzed according to the detection sequence to determine whether the various detection sub-results include continuous vacant spaces of preset size, which take the preset point as the center, when a certain detection sub-result includes the continuous vacant spaces of the preset size, which take the preset point as the center, analysis to the following detection sub-results is stopped, and the vacant space corresponding to the detection sub-result is directly determined as a vacant space for placement of the goods to be stored.

Exemplarily, the detection result as an image shot or acquired by the 2D camera is taken as an example, it assumes that the preset size only includes a preset length, the value of which is 50 cm, it determines that the actual physical size corresponding to 50 pixels in the image is 50 cm according to the characteristics of the 2D camera, the image is divided into sub-images along the length direction by using 50 pixels as a window and 5 pixels as a step length, then whether an obstacle exists in each sub-image is detected, if an obstacle exists in each sub-image, it indicates that the region corresponding to the sub-image is not a vacant space, and if an obstacle does not exist in each sub-image, it is determined that the region corresponding to the sub-image is the continuous vacant spaces of the preset size.

Optionally, the detecting a storage space corresponding to the storage instruction includes: detecting a first preset range in the storage space corresponding to the storage instruction, the first preset range being in accord with the preset size; and correspondingly, the determining, according to the detection result, whether the storage space includes continuous vacant spaces of preset size includes: determining whether an obstacle exists in the first preset range to determine whether the storage space includes the continuous vacant spaces of the preset size.

The first preset range may be a range of preset size at least of a designated storage space, such as a region in the middle of the storage space. An obstacle may be any object, such as other goods and a helmet.

Specifically, whether an obstacle exists in the first preset range may be determined on the basis of the detection result, if an obstacle exists in the first preset range, it is determined that the storage space does not include the continuous vacant spaces of the preset size, and if an obstacle does not exist in the first preset range, it is determined that the storage space includes the continuous vacant spaces of the preset size.

Step S304, in response to determining that the storage space corresponding to the storage instruction includes the continuous vacant spaces of the preset size, the goods to be stored are stored in the vacant spaces of the preset size of the storage space.

Specifically, if the storage space includes the continuous vacant spaces of the preset size, it indicates that the storage space is enough to be capable of storing the goods to be stored, and therefore, the goods to be stored may be stored in any determined continuous vacant space of the preset size. Alternatively, an optimal continuous vacant space of preset size may be determined from the various continuous vacant spaces of the preset size for placement of the goods to be stored.

Optionally, after determining that the storage space corresponding to the storage instruction includes continuous vacant spaces of preset size, the method further includes: determining the information of the datum point in the detection result; determining a second position according to the information of the datum point, where a distance between the second position and the datum point is smaller than or equal to a distance between the target position and the datum point; and moving to the second position.

The information of the datum point in the detection result may be detected on the basis of the sensor of the robot. The second position is a final position where the robot needs to be arrived from the target position. The second position is closer to the datum point relative to the target position.

Exemplarily, if the vacant space of the storage space is large enough to store the goods to be stored, in order to increase the space utilization rate of the rack, the goods to be stored may be stored at the end, close to the datum point, of the vacant space, for example, the column of the rack, and thus, more spaces may be reserved at the end far away from the datum point to store next goods to be stored.

Optionally, after determining, according to the detection result, whether the storage space corresponding to the storage instruction includes continuous vacant spaces of preset size, the method further includes: executing a storage or take-out task of first goods in response to determining that the storage space corresponding to the storage instruction does not include the continuous vacant spaces of the preset size, where the first goods are goods except the goods to be stored; and executing storage operation of the goods to be stored in response to detecting the continuous vacant spaces of the preset size.

The first goods may be an obstacle in the storage space, and thus, the robot takes out the first goods from the storage space. The first goods may also be another goods to be stored in the storage unit of the robot, the size of the other goods to be stored is smaller than the above-mentioned goods to be stored, the vacant spaces in the storage space meet the storage of the other storage goods, and thus, the robot stores the other goods to be stored of the smaller size in the storage space.

The first goods may further be another goods to be stored in the storage unit of the robot, after it is determined that the storage space corresponding to the storage instruction does not include the continuous vacant spaces of the preset size, the goods to be stored is not stored, and then storage operation of the goods to be stored is executed in a process of executing the storage operation of the first goods when the continuous vacant spaces of the preset size are detected.

In the method for storing goods provided by an embodiment of the present disclosure, after the robot moves to the target position according to the storage instruction and before storing the goods to be stored in the corresponding storage space of the rack, the storage space is detected, whether the storage space has enough continuous vacant spaces is determined according to the detection result, if the storage space has enough continuous vacant spaces, the goods to be stored are placed in the vacant spaces of the storage space, real-time detection on the space of a storage location before storage of the goods is achieved, when enough spaces exist, the goods are stored, and thus, the goods storage safety is improved.

FIG. 5 is a flowchart of a method for storing goods provided by another embodiment of the present disclosure, according to the method for storing goods provided by this embodiment, on the basis of the embodiment as shown in FIG. 3, step S303 is further elaborated, a step of determining the preset size is added before step S303, a step of removing the obstacle of the storage space is added after step S303, a step of uploading the storage information of the goods to be stored is added after step S304, and as shown in FIG. 5, the method for storing goods provided by this embodiment includes the following steps:

step S501, the robot moves to a target position according to the storage instruction for the goods to be stored.

Step S502, the storage space corresponding to the storage instruction is detected.

Specifically, after the robot may move to the target position, the carrying device is adjusted to a height corresponding to the storage space, and meanwhile, the carrying device rotates to a direction opposite to the storage space, the storage space is detected by means of the sensor arranged on the carrying device, and thus, the detection result is obtained.

Step S503, the spatial size of the largest vacant space of the storage space is determined according to the detection result.

Step S504, the preset size of the vacant spaces corresponding to the goods to be stored is determined according to the size information of the goods to be stored.

The size information of the goods to be stored may be acquired by means of the storage instruction, and may also be acquired by the sensor of the robot. The size information of the goods to be stored may include length of the goods to be stored, and may also include width and/or height.

Specifically, the size information of the goods to be stored may be contained into the storage instruction by the warehouse management apparatus, and thus, the robot may directly acquire the size information of the goods to be stored according to the storage instruction. Alternatively, the storage instruction only includes goods identification codes of the goods to be stored, the corresponding relation between the goods identification codes of the various goods and the size information is stored in the warehouse management apparatus in advance, and then the robot determines the size information of the goods to be stored according to the goods identification codes and the corresponding relation.

Specifically, the preset size may include preset length, and the preset length is the sum of the length of the goods to be stored and the preset safety length. The preset size may also include preset width, and the preset width is the sum of the width of the goods to be stored and the preset safety width. The preset size may include preset height, and the preset height is the sum of the height of the goods to be stored and the preset safety height. The vacant space of the preset size may be regarded as a minimum space in which the goods to be stored can be placed safely.

Specifically, the preset size may be a minimum storage size corresponding to the goods to be stored in a default orientation, or may be a minimum storage size corresponding to the goods to be stored after the goods to be stored rotate at an angle of 90 degrees on the basis of the default orientation.

Step S505, whether the spatial size of the largest vacant space is greater than or equal to the preset size is determined so as to determine whether the storage space includes the continuous vacant spaces of the preset size.

Specifically, when the spatial size of the largest vacant space is smaller than the preset size, it is determined that the storage space does not include the continuous vacant spaces of the preset size, and otherwise, it is determined that the storage space includes the continuous vacant spaces of the preset size.

Optionally, in response to determining that the storage space corresponding to the storage instruction does not include the continuous vacant spaces of the preset size, abnormity prompt information is generated.

Specifically, when the storage space does not include the continuous vacant spaces of the preset size, it indicates that the storage space does not meet the storage of the goods to be stored, and then the robot may generate abnormity prompt information, and may further send the abnormity prompt information to the warehouse management apparatus of the warehousing system.

Further, the robot may further determine the actual size of the continuous vacant spaces of the storage spaces according to the detection result, then abnormity prompt information is generated according to the actual size, and the abnormity prompt information is sent to the warehouse management apparatus so as to inform the warehouse management apparatus of the size of the actual vacant spaces of the storage space.

Exemplarily, the abnormity prompt information may be "the storage spaces are not enough", or "the length of the storage spaces is 40 cm, which is smaller than the length of the goods to be stored".

Step S506, in response to determining that the storage space corresponding to the storage instruction includes the continuous vacant spaces of the preset size, the goods to be stored are stored in the vacant spaces of the preset size of the storage space.

Step S507, the storage information of the goods to be stored is acquired, and the storage information is sent to the warehouse management apparatus of the warehousing system.

The storage information includes a placement position, pose information and spacing between the goods to be stored and an adjacent object.

Specifically, the storage information of the goods to be stored may be acquired by means of the sensor of the robot.

Further, the warehouse management apparatus acquires the storage information of the goods to be stored from the robot, and stores the storage information into a set memory so as to facilitate follow-up management operation on the goods to be stored, such as delivery and goods sorting.

Step S508, in response to determining that the storage space corresponding to the storage instruction does not include the continuous vacant spaces of the preset size and the storage space includes an obstacle, the obstacle in the storage space is removed.

The obstacle may be any object placed in the storage space, such as other goods, goods boxes, parcels and helmets.

Specifically, in response to determining that the storage space does not include the continuous vacant spaces of the preset size and the storage space includes an obstacle according to the detection result, the robot removes the obstacle in the storage space.

Optionally, the step of removing the obstacle in the storage space in response to determining that the storage space includes the obstacle according to the detection information, includes: recognizing the obstacle of the storage space, and determining whether the obstacle is a removable object; and if the obstacle is a removable object, removing the obstacle from the storage space.

Optionally, the step of determining whether the obstacle is a removable object, includes: determining whether the obstacle is a removable object according to whether the obstacle is a recorded object.

Specifically, when the obstacle is the recorded object, the obstacle is an unremovable object, and when the obstacle is an unrecorded object, the obstacle is a removable object, and then may be directly removed by the robot.

Specifically, storage location images of the storage space may be acquired by means of the carrying device arranged on the robot or a visual sensor on a robot body, such as a 2D camera and a 3D camera, the type of obstacles is recognized on the basis of a preset image recognition arithmetic, and then whether the obstacle is a removable object is determined via the robot.

Specifically, size information and/or spacing information of the obstacle may be recognized, and then whether the obstacle is a removable object is determined according to the size information and/or spacing information of the obstacle.

Further, whether the obstacle is a removable object may be determined according to the object size of the obstacle. When the object size of the obstacle is greater than a preset object size, it is determined that the obstacle is an unremovable object, and when the object size of the obstacle is smaller than or equal to the preset object size, it is determined that the obstacle is a removable object.

Further, if the spacing information of the obstacle is smaller than a spacing threshold, it is determined that the obstacle is an unremovable object, and when the spacing information of the obstacle is greater than or equal to the spacing threshold, it is determined that the obstacle is a removable object.

Optionally, the determining whether the obstacle is a removable object according to whether the obstacle is a recorded object includes: determining whether the obstacle is a removable object according to the object size of the obstacle in a case that the obstacle is an unrecorded object; acquiring placement information of a recorded object in a case that the obstacle is the recorded object; and determining, according to the placement information, whether the obstacle is a removable object.

An unrecorded object is an obstacle which is not recorded by the warehousing system, and may be an object stored on the rack by mistake. A recorded object is an object of which the relevant information is stored in the warehousing system, such as goods boxes, parcels, packing cases or other objects of which the storage information including identification codes, sizes, goods loading conditions and the like is stored. The placement information may include information such as spacing information and a placement angle.

Specifically, when the obstacle is an unrecorded object, whether the obstacle is a removable object may be determined according to the object size of the obstacle. When the object size of the unrecorded object is greater than the preset object size, it is determined that the obstacle is an unremovable object, and otherwise, it is determined that the obstacle is a removable object. The preset object size may be a smaller one of a maximum object size corresponding to the storage space and the size of the largest goods or object which can be taken by the carrying device of the robot.

Specifically, when the obstacle is a recorded object, it may determine whether the placement information of the recorded object is abnormal, if the placement information of the recorded object is not abnormal, it may determine that the recorded object is an unremovable object, the information corresponding to the storage space needs to be updated according to the relevant information, such as the storage information, of the recorded object, and new storage spaces are distributed for the goods to be stored. If the placement information of the recorded object is abnormal, further analysis needs to be carried out according to specific abnormity conditions so as to determine whether the recorded object is a removable object.

Optionally, the determining, according to the placement information, whether the obstacle is a removable object includes: determining, according to a placement angle in the placement information, whether the obstacle is a removable object in a case that goods spacing in the placement information meets preset safety spacing; and determining that the obstacle is an unremovable object, and marking the storage space as an abnormal storage location in a case that the goods spacing in the placement information does not meet the preset safety spacing.

The placement angle refers to the pose of the recorded object, and may be an angle relative to a default pose. The default pose for placement of goods is typically: when the robot takes the goods, the front of the goods faces the robot. The preset safety spacing may be determined according to the type or the size of the carrying device of the robot, and for a carrying device including suction cups, the preset safety spacing can be very small, such as 3 cm, and even ignored; for a carrying device including a left telescopic arm and a right telescopic arm, the preset safety spacing is at least the width of the telescopic arms; for a carrying device including a manipulator arm or a robotic arm, the preset safety spacing should be at least the width of the gripping or hooking portion of the robotic arm.

Specifically, when the spacing information is smaller than the preset safety spacing, when a goods-taking device of the robot takes the obstacle, the obstacle or adjacent goods may be damaged, and thus, it is determined that the obstacle or recorded object is an unremovable object. In order to avoid the circumstance that the storage space is distributed for other goods to be stored, the storage space is marked as an abnormal storage location so as to remind related personnel to carry out manual inspection or removal of the obstacles of the storage space.

Specifically, when the placement angle is within a preset angle range, it is determined that the occupying object is a removable object, and otherwise, it is determined that the occupying object is an unremovable object. Specifically, the preset angle range may be (−5°, 5°), (−10°, 10°), (−15°, 15°), (85°, 95°), or other ranges.

Specifically, when the robot determines that the occupying object is a removable object, the occupying object may be taken out from the storage space via the robot, and then the goods to be stored are placed in the storage space via the robot. Of course, the occupying may also be taken out from the storage space via a second robot, and then the goods to be stored are placed in the storage space via a first robot.

Step S509, second detection information of the storage space in which the obstacle has been removed is acquired.

Specifically, the specific process of the step is similar to that of step S302, and is not described herein again.

Step S510, whether the storage space in which the obstacle has been removed includes the continuous vacant spaces of the preset size is determined according to the second detection information.

Specifically, the specific process of the step is similar to that of step S303, only the detection result is corrected into the second detection information with regard to the storage space in which the obstacle has been removed, and thus, it is not described herein again.

Step S511, when the storage space in which the obstacle has been removed includes the continuous vacant spaces of the preset size, the goods to be stored are stored in the vacant spaces of the preset size of the storage space in which the obstacle has been removed.

In this embodiment, before goods are stored, the storage space is detected automatically in real time, when enough spaces exist, the goods are stored, thus, the safety for goods storage is improved, unnecessary loss caused by insufficient space is avoided. With regard to the storage space including an obstacle, the obstacle is recognized automatically and removed, the storage space with insufficient spaces is automatically adjusted to overcome space abnormity, normal storage of the goods to be stored is achieved, and the safety and efficiency of goods storage are improved.

Figures 6A, 6B:
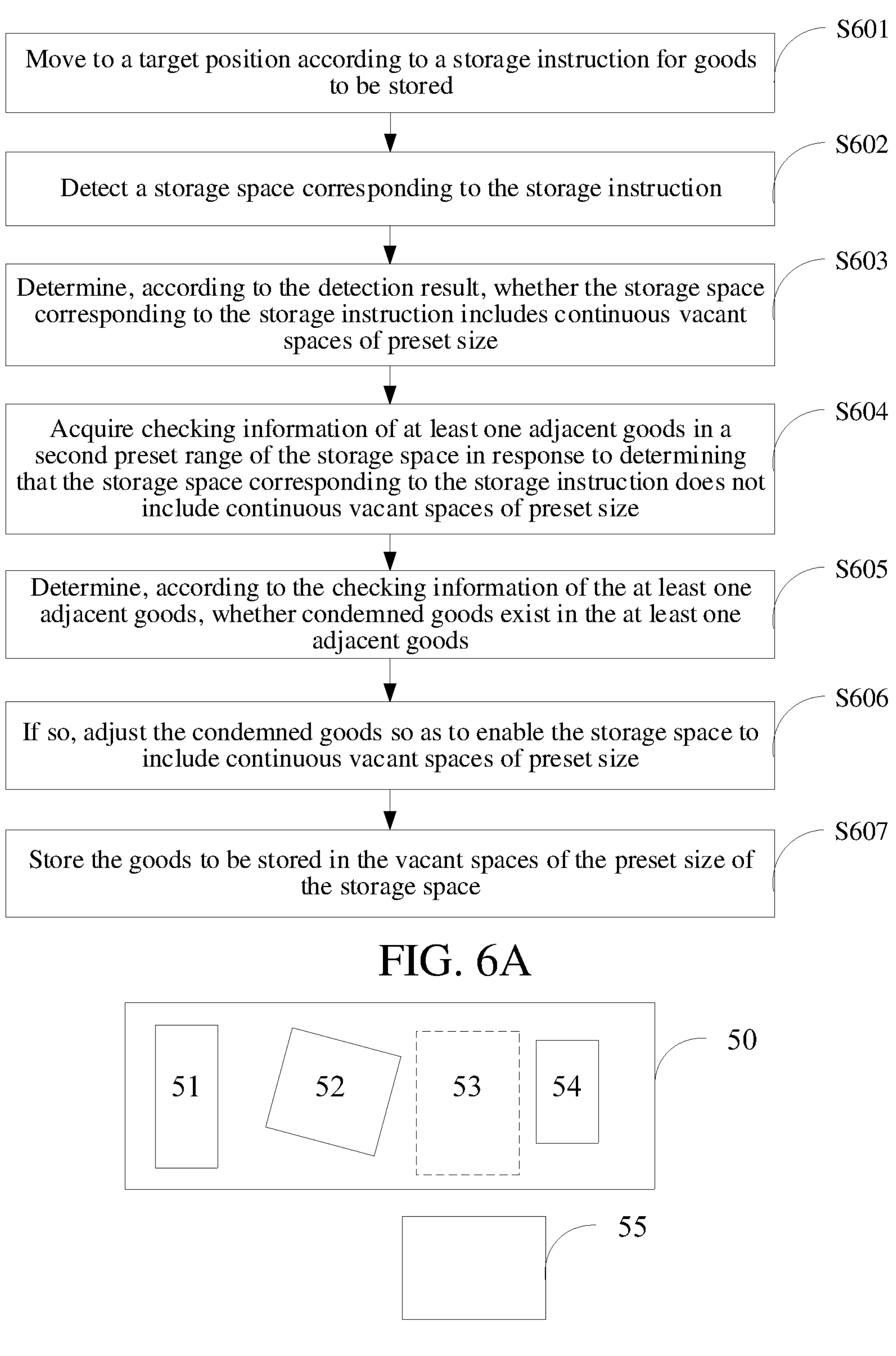
FIG. 6A is a flowchart of a method for storing goods provided by another embodiment of the present disclosure.
FIG. 6B is a schematic diagram of storage of condemned goods in the embodiment as shown in FIG. 6A of the present disclosure.

FIG. 6A is a flowchart of a method for storing goods provided by another embodiment of the present disclosure, in this embodiment, with regard to the storage space not including an obstacle and not including continuous vacant spaces of preset size, according to the method for storing goods provided by this embodiment, a step of checking adjacent goods is added after step S303 on the basis of the embodiment as shown in FIG. 3, and as shown in FIG. 6A, the method for storing goods provided by this embodiment includes the following steps:

step S601, the robot moves to a target position according to the storage instruction for the goods to be stored.

Step S602, the storage space corresponding to the storage instruction is detected.

Step S603, whether the storage space corresponding to the storage instruction includes continuous vacant spaces of preset size is determined according to the detection result.

Step S604, in response to determining that the storage space corresponding to the storage instruction does not include the continuous vacant spaces of the preset size, checking information of at least one adjacent goods in the second adjacent range of the storage space is acquired.

The preset range may be a range corresponding to 3 storage locations on the left side and 3 storage locations on the right side of the storage space, and may also be 2 storage locations, 5 storage locations or other values. The checking information may include spacing information of the adjacent goods.

The adjacent goods may be goods on the same layer of the same rack as the storage space, and the adjacent goods may include one or more of left adjacent goods, right adjacent goods, front adjacent goods and rear adjacent goods of the storage space. The left adjacent goods are one or more goods which are adjacent to the storage space and located on the left side of the storage space; the right adjacent goods are one or more goods which are adjacent to the storage space and located on the right side of the storage space; the front adjacent goods are one or more goods which are adjacent to the storage space and located on the front side of the storage space; and the rear adjacent goods are one or more goods which are adjacent to the storage space and located on the rear side of the storage space. The spacing information may be a spacing between the adjacent goods and various goods around the adjacent goods or the edge of the rack.

Optionally, the acquiring checking information of at least one adjacent goods in a second preset range of the storage space includes: successively acquiring checking information of various adjacent goods in the preset range according to a sequence of distances among the storage spaces from near to far.

Of course, another checking sequence may also be utilized to check adjacent goods in the preset range.

Step S605, whether condemned problems exist in the at least one adjacent goods is determined according to the checking information of the at least one adjacent goods.

Specifically, the spacing information of the condemned problems may be greater than the corresponding spacing threshold. With regard to each adjacent goods, if the spacing information of at least one adjacent goods is greater than the corresponding spacing threshold, it is determined that the adjacent goods are condemned goods.

Optionally, the checking information includes spacing information and goods pose of the adjacent goods, the step of determining whether condemned goods exist in the at least one adjacent goods according to the checking information of the at least one adjacent goods, includes: acquiring the spacing threshold and the preset pose of each adjacent goods; and with regard to each adjacent goods, determining that the adjacent goods are condemned goods when the checking information of the adjacent goods meets any one of the following conditions: the spacing information of the adjacent goods is greater than the spacing threshold of the adjacent goods; and the goods pose of the adjacent goods is inconsistent to preset pose.

Exemplarily, FIG. 6B is a schematic diagram of storage of a condemned goods in an embodiment shown in FIG. 6A of the present disclosure, as shown in FIG. 6B, a rack 50 is stored with goods 51, goods 52 and goods 54, the goods to be stored are goods 55, and the corresponding storage space of the goods to be stored is a space 53. However, due to the left adjacent goods of the space 53 for the goods 55, the goods 52 are stored in a wrong pose, that is, the goods 52 are deflected, so that the spatial size of the space 53 is smaller than the preset size, and the goods 52 are the condemned goods.

Figure 6C:
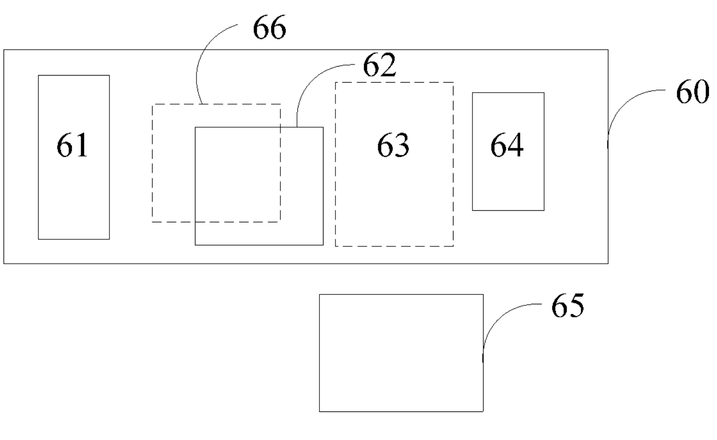
FIG. 6C is a schematic diagram of storage of another condemned goods in the embodiment as shown in FIG. 6A of the present disclosure.

Exemplarily, FIG. 6C is a schematic diagram of storage of another condemned goods in an embodiment as shown in FIG. 6A of the present disclosure, as shown in FIG. 6C, a rack 60 is stored with goods 61, goods 62 and goods 64, the goods to be stored are goods 65, and the corresponding storage space of the goods to be stored is a space 63. However, due to the left adjacent goods of the space 63 for the goods 65, the goods 62 are stored in a wrong position, that is, the goods 62 move evenly, the preset position of the goods is a position corresponding to a space 66, thus, the spacing between the goods 62 and the goods 61 is over large, but the spacing between the goods and the space 63 is over small, and then the goods 62 are the condemned goods.

Figure 6D:
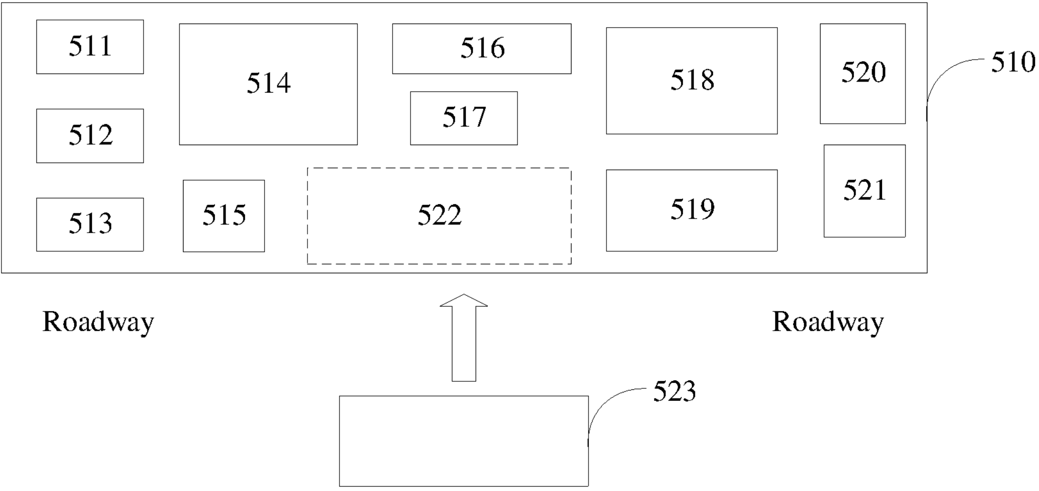
FIG. 6D is a schematic diagram of rack storage in the embodiment as shown in FIG. 6A of the present disclosure.

Exemplarily, FIG. 6D is a schematic diagram of storage of an embodiment as shown in FIG. 6A of the present disclosure, as shown in FIG. 6D, a rack 510 includes goods 511-522, the storage space corresponding to the goods to be stored 523 is a storage space 522, the storage space 522 is a free space, however, the spatial size of the storage space 522 is smaller than the preset size of storage in the warehousing system, it is determined that the goods with abnormal spacing are condemned goods from the various adjacent goods selectively according to the spacing information of the left adjacent goods (goods 515), right adjacent goods (goods 519) and rear adjacent goods (goods 517 and goods 514) of the goods 522, that is, the spacing information between the goods 515 and the goods 513, the spacing information between the goods 517 and the goods 516, the spacing information between the goods 514 and a rear border of the rack and the spacing information between the goods 519 and the goods 521, the condemned goods are adjusted, thus, the spatial size of the storage space 522 is increased to meet the size condition for the goods to be stored 523, then the goods to be stored may be placed on the goods 522, and storage of the goods to be stored 523 is finished. The condemned goods may be all, part or one of the adjacent goods, for example, the goods 519.

Specifically, with regard to each adjacent goods, whether the spacing information of the adjacent goods is greater than the corresponding spacing threshold may be determined, and if the spacing information of the adjacent goods is greater than the corresponding spacing threshold, the position of the adjacent goods is adjusted according to the difference between the spacing information of the adjacent goods and the corresponding spacing threshold.

The spacing threshold may be determined according to the size information of the adjacent goods.

When the storage space is a free space and does not meet the size condition, a storage location is adjusted according to the storage of the adjacent goods, thus, the spatial size of the storage space is increased, a mode for solving an abnormal condition is provided, and goods storage efficiency and intelligence degree of the warehousing system are improved.

Step S606, if condemned problems exist in the at least one adjacent goods, the condemned problems are adjusted so that the storage space includes continuous vacant space of preset size.

Specifically, the condemned goods may be adjusted to enable the storage space to include the continuous vacant spaces of the preset size.

Specifically, an adjusting instruction for the condemned goods may be generated according to the spatial size, the preset size and the spacing information, which is greater than the corresponding spacing threshold, of the condemned goods.

Specifically, with regard to the condemned goods of which the goods pose is inconsistent to the preset pose, an adjusting instruction for the condemned goods may be generated according to the goods pose and the preset pose so as to adjust the goods pose of the condemned goods into the preset pose; and with regard to the condemned goods with the spacing information greater than the spacing threshold, an adjusting instruction may be generated according to the spacing information of the condemned goods and the corresponding spacing threshold so as to adjust the spacing information of the condemned goods into the spacing threshold. When both the pose and spacing of the condemned goods are inconsistent to the preset pose and the spacing threshold, an adjusting instruction for the condemned goods may be generated according to the goods pose, the preset pose, the spacing information and the spacing threshold so as to enable the spacing information of the condemned goods to be spacing threshold and the goods pose to be the preset pose.

Further, if it is determined that condemned goods do not exist in the various adjacent goods, the storage space is marked as an abnormal storage location, and a next storage space for the goods to be stored is acquired.

Step S607, the goods to be stored are stored in the vacant space of the preset size of the storage space.

In this embodiment, with regard to the storage space which does not include the continuous vacant spaces of the preset size, condemned goods are determined by detecting the checking information of various adjacent goods in the second preset range of the storage space, the condemned goods are adjusted so as to enable the storage space to include enough vacant spaces to store the goods to be stored, automatic detection of the storage space is achieved, meanwhile, the storage space with insufficient spaces is automatically adjusted to overcome space abnormity, normal storage of the goods to be stored is achieved, and the safety and efficiency of storage of goods are improved.

Figure 7:
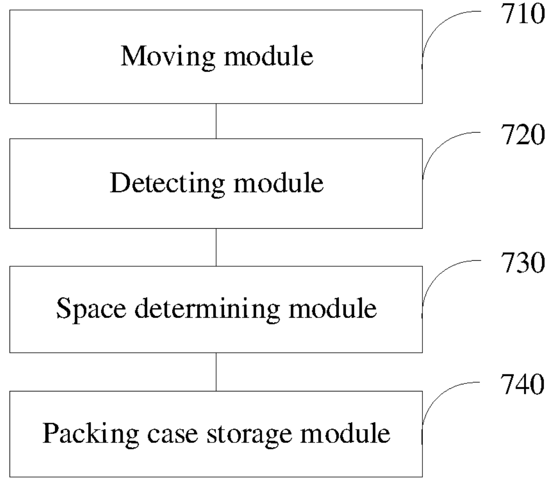
FIG. 7 is a schematic structural diagram of a device for storing goods provided by an embodiment of the present disclosure.

FIG. 7 is a schematic structural diagram of a device for storing goods provided by an embodiment of the present disclosure, as shown in FIG. 7, the device for storing goods includes: a moving module, 710, a detecting module 720, a space determining module 730 and a goods storage module 740.

The moving module 710 is configured to move to a target position according to a storage instruction for the goods to be stored; the detecting module 720 is configured to detect a storage space corresponding to the storage instruction, where the storage space for the goods to be stored is determined according to the size information of the goods to be stored and a dynamic goods storage space on a rack corresponding to the goods to be stored; the space determining module 730 is configured to determine whether the storage space includes continuous vacant spaces of the preset size according to the detection result; and a goods storage module 740 is configured to store the goods to be stored in the vacant spaces of the preset size of the storage space if the storage space corresponding to the storage instruction includes the continuous vacant space of the preset size.

Optionally, the storage instruction includes information of a datum point, the moving module 710 is specifically configured to: move to a first position corresponding to the datum point according to the information of the datum point; and move to the target position from the first position.

Optionally, the storage instruction includes position information of the storage space and the information of the datum point, the moving module 710 is specifically configured to: move to a target rack corresponding to the storage space according to the position information of the storage space; and adjust the position according to the information of the datum point of the target rack so as to move to the target position according to the adjusted position.

Optionally, the device for storing goods further includes: a datum point determining module, configured to determine the information of the datum point in the detection result after it is determined that the storage space corresponding to the storage instruction includes the continuous vacant spaces of the preset size; and a position adjusting module, configured to determine a second position according to the information of the datum point, where the distance between the second position and the datum point is smaller than or equal to the distance between the target position and the datum point; and move to the second position.

Optionally, the detecting module 720 is specifically configured to: detect a storage space corresponding to the storage instruction by means of a sensor arranged on the robot.

Optionally, the space determining module 730 is specifically configured to: determine, according to the detection result, whether the storage space includes continuous vacant spaces of preset size, where the continuous vacant space takes the preset point of the storage space as the center.

Optionally, the space determining module 730 is specifically configured to: determine the spatial size of the largest vacant space of the storage space according to the detection result; and determine whether the spatial size of the largest vacant space is greater than or equal to the preset size so as to determine whether the storage space includes continuous vacant spaces of preset size.

Optionally, the space determining module 730 is specifically configured to: detect a first preset range in the storage space corresponding to the storage instruction, where the first preset range is in accord with the preset size; and correspondingly, the step of determining, according to the detection result, whether the storage space includes continuous vacant spaces of preset size, includes: determining whether an obstacle exists in the first preset range so as to determine whether the storage space includes continuous vacant spaces of preset size.

Optionally, the storage instruction includes size information of the goods to be stored, the device for storing goods further includes: a preset size determining module, configured to determine, according to the size information of the goods to be stored, the preset size of the vacant space corresponding to the goods to be stored before determining, according to the detection result, whether the storage space includes continuous vacant spaces of preset size.

Optionally, the device further includes: an abnormity prompt module, configured to generate abnormity prompt information in response to determining that the storage space corresponding to the storage instruction does not include continuous vacant spaces of preset size after determining, according to the detection result, whether the storage space corresponding to the storage instruction includes continuous vacant spaces of preset size.

Optionally, the storage space includes an obstacle, the device further includes: an obstacle removing module, configured to remove the obstacle in the storage space in response to determining that the storage space corresponding to the storage instruction does not include continuous vacant spaces of preset size after determining, according to the detection result, whether the storage space corresponding to the storage instruction includes continuous vacant spaces of preset size; a second detection information acquiring module, configured to obtain second detection information of the storage space after the obstacle is removed; a second space determining module, configured to determine, according to the second detection information, whether the storage space in which the obstacle has been removed includes continuous vacant spaces of preset size; and a second goods storage module, configured to store the goods to be stored in the vacant space of the preset size of the storage space in which the obstacle has been removed when the storage space in which the obstacle has been removed includes continuous vacant spaces of preset size.

Optionally, the obstacle removing module includes: an obstacle recognition unit, configured to recognize the obstacle of the storage space, and determine whether the obstacle is a removable object; and an obstacle removing unit, configured to remove the obstacle from the storage space if the obstacle is a removable object.

Optionally, the obstacle recognition unit is specifically configured to:

recognize the obstacle of the storage space; and determine whether the obstacle is a removable object according to whether the obstacle is a recorded object.

Optionally, the obstacle recognition unit is specifically configured to: determine, according to the object size of the obstacle, whether the obstacle is a removable object when the obstacle is an unrecorded object; acquire placement information of the recorded object when the obstacle is the recorded object; and determine, according to the placement information, whether the obstacle is a removable object.

Optionally, the obstacle recognition unit is specifically configured to: acquire the placement information of the recorded object when the obstacle is the recorded object; determine, according to a placement angle in the placement information, whether the obstacle is a removable object when goods spacing in the placement information meets preset safety spacing; and determine that the obstacle is an unremovable object and mark the storage space as an abnormal storage location when the goods spacing in the placement information does not meet the preset safety spacing.

Optionally, the device further includes: a checking module, configured to acquire checking information of at least one adjacent goods in the second preset range of the storage space in response to determining that the storage space corresponding to the storage instruction does not include continuous vacant spaces of preset size after determining, according to the detection result, whether the storage space corresponding to the storage instruction includes continuous vacant spaces of preset size; a condemned goods determining module, configured to determine, according to the checking information of the at least one adjacent goods, whether the condemned goods exist in the at least one adjacent goods; and a goods adjusting module, configured to adjust condemned goods if the condemned goods exist.

Optionally, the checking module is specifically configured to: successively acquire checking information of the various adjacent goods in the preset range according to the sequence of distances among the storage spaces from near to far.

Optionally, after determining, according to the detection result, whether the storage space corresponding to the storage instruction includes continuous vacant spaces of preset size, the device further includes: a first goods operation module, configured to execute a storage or take-out task of first goods in response to determining that the storage space corresponding to the storage instruction does not include continuous vacant spaces of preset size, where the first goods are goods except the goods to be stored; and a goods to be stored operation module, configured to execute storage operation of the goods to be stored when the continuous vacant spaces of the preset size are detected.

Optionally, the device further includes: a storage information acquiring module, configured to acquire storage information of the goods to be stored after the goods to be stored are stored in the vacant space of the preset size of the storage space, where the storage information includes one or more of placement position, pose information and spacing between the goods to be stored and an adjacent object; and send the storage information of the goods to be stored to a warehouse management apparatus.

The device for storing goods provided by this embodiment of the present disclosure can execute the method for storing goods provided by any embodiment of the present disclosure, and has corresponding functional modules and beneficial effects of the executed method.

Figures 8, 9:
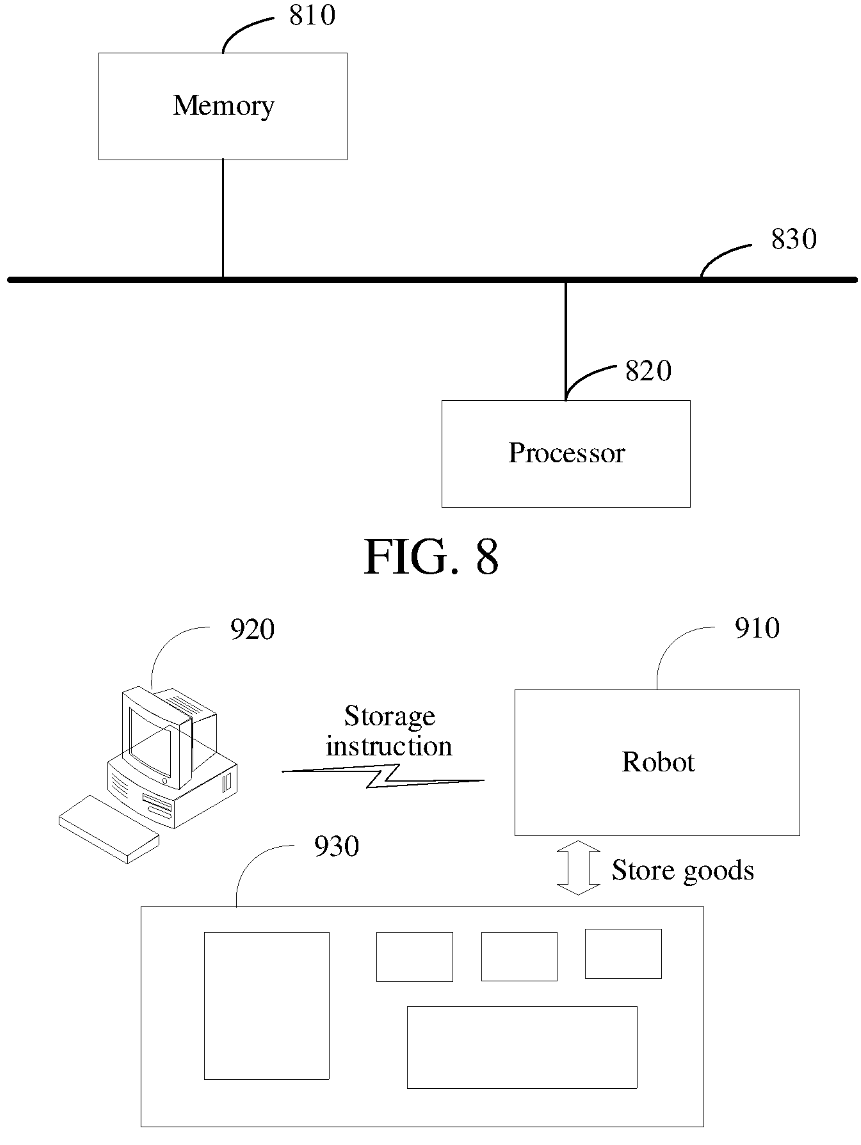
FIG. 8 is a schematic structural diagram of a robot provided by an embodiment of the present disclosure.
FIG. 9 is a schematic structural diagram of a warehousing system provided by an embodiment of the present disclosure.

FIG. 8 is a schematic structural diagram of a robot provided by an embodiment, as shown in FIG. 8, the robot includes: a memory 810, a processor 820 and a computer program.

The computer program is stored in the memory 810, and is configured to be executed by the processor 820 so as to achieve the method for storing goods provided any embodiment in the embodiments corresponding to FIG. 2 to FIG. 6A of the present disclosure.

The memory 810 and the processor 820 are connected by means of a bus 830.

Of course, the robot further includes a carrying device, a sensor and a moving device. The carrying device may be devices such as a fork and a manipulator arm, and is configured to take and/or store goods. The sensor may be arranged on a robot body of the robot, and may further be arranged on the carrying device, and the sensor may include one or more of a laser sensor, a ultrasonic sensor, an infrared sensor, a 2D camera and a 3D camera.

Further, the robot may further include a storage unit, and is configured to store goods.

The relevant illustration may be understood with reference to the relevant description and effect corresponding to the steps in FIG. 2 to FIG. 6A, and redundant description is not repeated here.

Optionally, the robot includes a mobile chassis, a carrying device, a storage rack and a lifting/lowering assembly; and the storage rack, the carrying device and the lifting/lowering assembly are mounted on the mobile chassis.

Optionally, the carrying device includes one or more of: a telescopic arm assembly, a suction cup and a robotic arm.

Optionally, the carrying device includes a supporting plate and a steering structure, and the steering structure is configured to change the orientation of goods placed on the supporting plate.

FIG. 9 is a schematic structural diagram of a warehousing system provided by an embodiment of the present disclosure, and as shown in FIG. 9, the warehousing system includes: a robot 910, a warehouse management apparatus 920 and a rack 930.

The robot 910 is the robot provided by the embodiment as shown in FIG. 8 of the present disclosure, the rack 930 is configured to store goods; and the warehouse management apparatus 930 is configured to generate a storage instruction for goods, so that the robot 910 stores goods on the basis of the storage instruction and the method for storing goods.

An embodiment of the present disclosure provides a computer-readable storage medium, which is stored with a computer program, and the computer program is executed by the processor to achieve the method for storing goods provided any embodiment in the embodiments corresponding to FIG. 2 to FIG. 6A of the present disclosure.

The computer-readable storage medium may be ROM, a random access memory (RAM), CD-ROM, a magnetic tape, a floppy disk, an optical data storage device, and the like.

The present disclosure further provides a program product, the program product includes an executable computer program, and the executable computer program is stored in the readable storage medium. At least one processor of the robots or the warehousing system may read the computer program from the readable storage medium, and the at least one processor executes the computer program so that the robots form a team to control the device to implement the method for storing goods provided by the various modes of implementation.

In several embodiments provided by the present disclosure, it should be understood that the disclosed device and method may be implemented in other ways. For example, the above-described device embodiments are merely illustrative, and for example, the division of the modules is only one logical functional division, and other divisions may be realized in practice, for example, a plurality of modules may be combined or integrated into another system, or some features may be omitted, or not executed. In addition, the shown or discussed coupling or direct coupling or communication connection between each other may be through some interfaces, indirect coupling or communication connection between devices or modules, and may be in an electrical, mechanical or other form.

The modules described as separate parts may or may not be physically separate, and parts displayed as modules may or may not be physical units, may be located in one position, or may be distributed on multiple network units. Some or all of the modules may be selected according to actual needs to achieve the purpose of the solution of this embodiment.

In addition, functional modules in the embodiments of the present disclosure may be integrated into one processing unit, or each module may exist alone physically, or two or more modules are integrated into one unit. The unit formed by the modules can be realized in a hardware mode, and can also be realized in a mode of hardware and a software functional unit.

The integrated module implemented in the form of a software functional module may be stored in a computer-readable storage medium. The software functional module is stored in a storage medium and includes several instructions for enabling a computer device (which may be a personal computer, a server, or a network device) or a processor to execute some steps of the methods according to the embodiments of the present disclosure.

It should be understood that the processor may be a central processing unit (CPU), other general purpose processor, a digital signal processor (DSP), an application specific integrated circuit (ASIC), and the like. A general purpose processor may be a microprocessor or the processor may be any conventional processor or the like. The steps of the method disclosed in connection with the invention may be directly executed by a hardware processor, or by a combination of hardware and software modules in the processor.

The memory may include a high speed RAM memory, and may further include a non-volatile storage NVM, such as at least one magnetic disk memory, and may also be a USB disk, a removable hard disk, a read-only memory, a magnetic or optical disk, or the like.

The bus may be an industry standard architecture (ISA) bus, a peripheral component interconnect (PCI) bus, an extended industry standard architecture (EISA) bus, or the like. The bus may be divided into an address bus, a data bus, a control bus and the like. The buses in the figures of the present disclosure are not limited to only one bus or one type of bus for ease of illustration.

The storage medium may be implemented by any type or combination of volatile and non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and magnetic or optical disks. A storage medium may be any available medium that can be accessed by a general purpose or special purpose computer.

An exemplary storage medium is coupled to the processor such the processor can read information from, and write information to, the storage medium. Of course, the storage medium may also be integral to the processor. The processor and the storage medium may reside in an application specific integrated circuits (ASIC). Of course, the processor and the storage medium may reside as discrete components in an electronic device or host device.

Those of ordinary skill in the art will understand that: all or a portion of the steps of implementing the above-described method embodiments may be performed by hardware associated with program instructions. The foregoing program may be stored in a computer-readable storage medium. When the program is executed, steps including the method embodiments described above are executed; and the aforementioned storage medium includes: various media that can store program codes, such as ROM, RAM, magnetic or optical disks.

Finally, it should be noted that: the above embodiments are only used for illustrating the technical solutions of the present disclosure, and not for limiting the same; although the present disclosure has been described in detail with reference to the foregoing embodiments, those of ordinary skill in the art will understand that: the technical solutions described in the foregoing embodiments may still be modified, or some or all of the technical features may be equivalently replaced; such modifications or substitutions do not depart from the scope of the embodiments of the present disclosure by the essence of the corresponding technical solutions.

What is claimed is:

1. A method for storing goods, executable by a robot of a warehousing system, comprising:
moving to a target position according to a storage instruction for goods to be stored;
detecting a storage space corresponding to the storage instruction after moving to the target position, wherein the storage space for the goods to be stored is determined according to size information of the goods to be stored and a dynamic goods storage area on a target rack corresponding to the goods to be stored, wherein the dynamic goods storage area on the target rack is a continuous space and is capable of being divided into storage spaces of any size smaller than a physical size of the dynamic goods storage area;
determining, according to the detection result, whether the storage space corresponding to the storage instruction comprises a continuous vacant space of a preset size, wherein the preset size is determined according to the size information of the goods to be stored; and
storing the goods to be stored in the vacant space of the preset size of the storage space in response to determining that the storage space corresponding to the storage instruction comprises the continuous vacant space of the preset size;
wherein the determining, according to the detection result, whether the storage space corresponding to the storage instruction comprises the continuous vacant space of the preset size comprises:
determining whether an obstacle exists in a first preset range to determine whether the storage space comprises the continuous vacant space of the preset size, wherein the first preset range is detected in the storage space corresponding to the storage instruction, and the first preset range is at least a range of the preset size;
determining that the storage space corresponding to the storage instruction comprises the continuous vacant space of the preset size in response to determining that the obstacle does not exist in the first preset range; and
determining that the storage space corresponding to the storage instruction does not comprise the continuous vacant space of the preset size in response to determining that the obstacle exists in the first preset range.

2. The method according to claim 1, wherein the storage instruction comprises information of a datum point, and the moving to the target position according to the storage instruction for goods to be stored comprises: moving to a first position corresponding to the datum point according to the information of the datum point; and moving to the target position from the first position.

3. The method according to claim 1, wherein after determining that the storage space corresponding to the storage instruction comprises the continuous vacant space of the preset size, the method further comprises:
determining information of a datum point in the detection result;
determining a second position according to the information of the datum point, wherein a distance between the second position and the datum point is smaller than or equal to a distance between the target position and the datum point; and
moving to the second position.

4. The method according to claim 3, wherein the datum point comprises one or more of a column of the target rack, a mark point of the target rack and one or more goods placed at adjacent positions of the storage space.

5. The method according to claim 1, wherein the storage instruction comprises the size information of goods to be stored, and before determining, according to the detection result, whether the storage space comprises the continuous vacant space of the preset size, the method further comprises:
determining, according to the size information of the goods to be stored, the preset size of the vacant space corresponding to the goods to be stored.

6. The method according to claim 1, wherein after determining, according to the detection result, whether the storage space corresponding to the storage instruction comprises the continuous vacant space of the preset size, the method further comprises:
removing the obstacle in response to determining that the storage space corresponding to the storage instruction does not comprise the continuous vacant space of the preset size;
obtaining second detection information of the storage space in which the obstacle has been removed;
determining, according to the second detection information, whether the storage space in which the obstacle has been removed comprises the continuous vacant space of the preset size; and
storing the goods to be stored in the continuous vacant space of the preset size of the storage space in which the obstacle has been removed in a case that the storage space in which the obstacle has been removed comprises the continuous vacant space of the preset size.

7. The method according to claim 1, wherein after storing the goods to be stored in the vacant space of the preset size of the storage space, the method further comprises:

acquiring storage information of the goods to be stored, wherein the storage information comprises one or more of a placement position, pose information and spacing between the goods to be stored and an adjacent object; and sending the storage information of the goods to be stored to a warehouse management apparatus.

8. The method according to claim 1, wherein after determining, according to the detection result, whether the storage space corresponding to the storage instruction comprises the continuous vacant space of the preset size, the method further comprises:

acquiring checking information of at least one adjacent goods in a second preset range of the storage space in response to determining that the storage space corresponding to the storage instruction does not comprise the continuous vacant space of the preset size;

determining, according to the checking information of the at least one adjacent goods, whether condemned goods exist in the at least one adjacent goods; and adjusting the condemned goods in a case that the condemned goods exist in the at least one adjacent goods.

9. A robot, comprising:

a memory; and at least one processor, wherein the memory is configured to store a computer-executable instruction; and wherein the at least one processor is configured to execute the computer-executable instruction stored by the memory to cause the robot to:

move to a target position according to a storage instruction for goods to be stored;

detect a storage space corresponding to the storage instruction after moving to the target position, wherein the storage space for the goods to be stored is determined according to size information of the goods to be stored and a dynamic goods storage area on a target rack corresponding to the goods to be stored, wherein the dynamic goods storage area on the target rack is a continuous space and is capable of being divided into storage spaces of any size smaller than a physical size of the dynamic goods storage area;

determine, according to the detection result, whether the storage space corresponding to the storage instruction comprises a continuous vacant space of a preset size, wherein the preset size is determined according to the size information of the goods to be stored; and store the goods to be stored in the vacant space of the preset size of the storage space in response to determining that the storage space corresponding to the storage instruction comprises the continuous vacant space of the preset size;

wherein when the robot is caused to determine, according to the detection result, whether the storage space corresponding to the storage instruction comprises the continuous vacant space of the preset size, the robot is further caused to:

determine whether an obstacle exists in a first preset range to determine whether the storage space comprises the continuous vacant space of the preset size, wherein the first preset range is detected in the storage space corresponding to the storage instruction, and the first preset range is at least a range of the preset size;

determine that the storage space corresponding to the storage instruction comprises the continuous vacant space of the preset size in response to determining that the obstacle does not exist in the first preset range; and determine that the storage space corresponding to the storage instruction does not comprise the continuous vacant space of the preset size in response to determining that the obstacle exists in the first preset range.

10. The robot according to claim 9, wherein the storage instruction comprises information of a datum point, and the at least one processor is configured to execute the computer-executable instruction stored by the memory to further cause the robot to move to a first position corresponding to the datum point according to the information of the datum point and move to the target position from the first position.

11. The robot according to claim 9, wherein the at least one processor is configured to execute the computer-executable instruction stored by the memory to further cause the robot to:

determine information of a datum point in the detection result;

determine a second position according to the information of the datum point, wherein a distance between the second position and the datum point is smaller than or equal to a distance between the target position and the datum point; and move to the second position.

12. The robot according to claim 11, wherein the datum point comprises one or more of a column of the target rack, a mark point of the target rack and one or more goods placed at adjacent positions of the storage space.

13. The robot according to claim 9, wherein the at least one processor is configured to execute the computer-executable instruction stored by the memory to further cause the robot to:

remove the obstacle in response to determining that the storage space corresponding to the storage instruction does not comprise the continuous vacant space of the preset size;

obtain second detection information of the storage space in which the obstacle has been removed;

determine, according to the second detection information, whether the storage space in which the obstacle has been removed comprises the continuous vacant space of the preset size; and store the goods to be stored in the continuous vacant space of the preset size of the storage space in which the obstacle has been removed in a case that the storage space in which the obstacle has been removed comprises the continuous vacant space of the preset size.

14. The robot according to claim 9, wherein the at least one processor is configured to execute the computer-executable instruction stored by the memory to further cause the robot to:

acquire checking information of at least one adjacent goods in a second preset range of the storage space in response to determining that the storage space corresponding to the storage instruction does not comprise the continuous vacant space of the preset size;

determine, according to the checking information of the at least one adjacent goods, whether condemned goods exist in the at least one adjacent goods; and adjust the condemned goods in a case that the condemned goods exist in the at least one adjacent goods.

15. A warehousing system, comprising:

a robot comprising at least one processor and a memory configured to store computer-executable instructions;

a warehouse management apparatus; and a rack configured to store goods; and wherein the warehouse management apparatus is configured to generate a storage instruction for the goods;

wherein the at least one processor is configured to execute the computer-executable instruction stored by the memory to cause the robot to:

move to a target position according to the storage instruction for goods to be stored;

detect a storage space corresponding to the storage instruction after moving to the target position, wherein the storage space for the goods to be stored is determined according to size information of the goods to be stored and a dynamic goods storage space area on a target rack corresponding to the goods to be stored, wherein the dynamic goods storage area on the rack is a continuous space and is capable of being divided into storage spaces of any size smaller than a physical size of the dynamic goods storage area;

determine, according to the detection result, whether the storage space corresponding to the storage instruction comprises a continuous vacant space of a preset size, wherein the preset size is determined according to the size information of the goods to be stored; and store the goods to be stored in the vacant space of the preset size of the storage space in response to determining that the storage space corresponding to the storage instruction comprises the continuous vacant space of the preset size;

wherein when the robot is caused to determine, according to the detection result, whether the storage space corresponding to the storage instruction comprises the continuous vacant space of the preset size, the robot is further caused to:

determine whether an obstacle exists in a first preset range to determine whether the storage space comprises the continuous vacant space of the preset size, wherein the first preset range is detected in the storage space corresponding to the storage instruction, and the first preset range is at least a range of the preset size;

determine that the storage space corresponding to the storage instruction comprises the continuous vacant space of the preset size in response to determining that the obstacle does not exist in the first preset range; and determine that the storage space corresponding to the storage instruction does not comprise the continuous vacant space of the preset size in response to determining that the obstacle exists in the first preset range.

16. The warehousing system according to claim 15, wherein the at least one processor is configured to execute the computer-executable instruction stored by the memory to further cause the robot to:

acquire checking information of at least one adjacent goods in a second preset range of the storage space in response to determining that the storage space corresponding to the storage instruction does not comprise the continuous vacant space of the preset size;

determine, according to the checking information of the at least one adjacent goods, whether condemned goods exist in the at least one adjacent goods; and adjust the condemned goods in a case that the condemned goods exist in the at least one adjacent goods.

17. A computer program product, comprising a computer program, wherein computer-executable instructions are implemented when the computer program is executed by a processor, wherein the computer-executable instructions comprise:

moving to a target position according to a storage instruction for goods to be stored;

detecting a storage space corresponding to the storage instruction after moving to the target position, wherein the storage space for the goods to be stored is determined according to size information of the goods to be stored and a dynamic goods storage area on a target rack corresponding to the goods to be stored, wherein the dynamic goods storage area on the target rack is a continuous space and is capable of being divided into storage spaces of any size smaller than a physical size of the dynamic goods storage area;

determining, according to the detection result, whether the storage space corresponding to the storage instruction comprises a continuous vacant space of a preset size, wherein the preset size is determined according to the size information of the goods to be stored; and storing the goods to be stored in the vacant space of the preset size of the storage space in response to determining that the storage space corresponding to the storage instruction comprises the continuous vacant space of the preset size;

wherein the determining, according to the detection result, whether the storage space corresponding to the storage instruction comprises the continuous vacant space of the preset size comprises:

determining whether an obstacle exists in a first preset range to determine whether the storage space comprises the continuous vacant space of the preset size, wherein the first preset range is detected in the storage space corresponding to the storage instruction, and the first preset range is at least a range of the preset size;

determining that the storage space corresponding to the storage instruction comprises the continuous vacant space of the preset size in response to determining that the obstacle does not exist in the first preset range; and determining that the storage space corresponding to the storage instruction does not comprise the continuous vacant space of the preset size in response to determining that the obstacle exists in the first preset range.

18. The computer program product according to claim 17, wherein the storage instruction comprises information of a datum point, and the computer-executable instructions comprise moving to a first position corresponding to the datum point according to the information of the datum point; and moving to the target position from the first position.

19. The computer program product according to claim 17, wherein the computer-executable instructions comprise:

removing the obstacle in response to determining that the storage space corresponding to the storage instruction does not comprise the continuous vacant space of the preset size;

obtaining second detection information of the storage space in which the obstacle has been removed;

determining, according to the second detection information, whether the storage space in which the obstacle has been removed comprises the continuous vacant space of the preset size; and storing the goods to be stored in the continuous vacant space of the preset size of the storage space in which the obstacle has been removed in a case that the storage space in which the obstacle has been removed comprises the continuous vacant space of the preset size.

20. The computer program product according to claim 17, wherein the computer-executable instructions comprise:

acquiring checking information of at least one adjacent goods in a second preset range of the storage space in response to determining that the storage space corresponding to the storage instruction does not comprise the continuous vacant space of the preset size;

determining, according to the checking information of the at least one adjacent goods, whether condemned goods exist in the at least one adjacent goods; and adjusting the condemned goods in a case that the condemned goods exist in the at least one adjacent goods.

* * * * *